United States Patent
Zhang et al.

(10) Patent No.: US 12,144,035 B2
(45) Date of Patent: Nov. 12, 2024

(54) METHODS AND APPARATUSES FOR RECEIVING AND TRANSMITTING RANDOM ACCESS RESPONSE IN 2-STEP RANDOM ACCESS

(71) Applicant: FUJITSU LIMITED, Kawasaki (JP)

(72) Inventors: Jian Zhang, Beijing (CN); Qinyan Jiang, Beijing (CN); Yang Lu, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 339 days.

(21) Appl. No.: 17/590,082

(22) Filed: Feb. 1, 2022

(65) Prior Publication Data

US 2022/0225430 A1    Jul. 14, 2022

Related U.S. Application Data

(63) Continuation of application No. PCT/CN2019/101111, filed on Aug. 16, 2019.

(51) Int. Cl.
*H04W 74/0833* (2024.01)
*H04W 24/08* (2009.01)
(Continued)

(52) U.S. Cl.
CPC ....... *H04W 74/0841* (2013.01); *H04W 24/08* (2013.01); *H04W 72/0446* (2013.01);
(Continued)

(58) Field of Classification Search
None
See application file for complete search history.

(56) References Cited

U.S. PATENT DOCUMENTS

2018/0124822 A1   5/2018   Wang et al.
2018/0192401 A1   7/2018   Au et al.
(Continued)

FOREIGN PATENT DOCUMENTS

CN   103369701 A   10/2013
CN   109845378 A    6/2019
CN   109892000 A    6/2019

OTHER PUBLICATIONS

Communication pursuant to Article 94(3) EPC issued by the European Patent Office for corresponding European Patent Application No. 19942394.8, mailed on Jul. 6, 2023.
(Continued)

*Primary Examiner* — Hong S Cho
(74) *Attorney, Agent, or Firm* — Myers Wolin, LLC

(57) ABSTRACT

Methods and apparatuses for receiving and transmitting a random access response in a 2-step random access. The receiving apparatus includes: a first calculating unit configured to calculate a first RNTI, the first RNTI being different from an RA-RNTI actually used in a 4-step random access; a first detecting unit configured to use the first RNTI to detect downlink control information scheduling a random access response in a monitoring window; and a first receiving unit configured to, when the downlink control information is successfully detected, receive the random access response in a physical downlink shared channel (PDSCH) according to the downlink control information.

12 Claims, 21 Drawing Sheets

(51) Int. Cl.
  *H04W 72/0446* (2023.01)
  *H04W 72/0453* (2023.01)
  *H04W 72/1263* (2023.01)
  *H04W 72/23* (2023.01)
  *H04W 74/00* (2009.01)
  *H04W 74/08* (2024.01)

(52) U.S. Cl.
  CPC ... *H04W 72/0453* (2013.01); *H04W 72/1263* (2013.01); *H04W 72/23* (2023.01); *H04W 74/002* (2013.01); *H04W 74/0866* (2013.01)

(56) References Cited

U.S. PATENT DOCUMENTS

| | | | |
|---|---|---|---|
| 2018/0198650 | A1 | 7/2018 | Nogami et al. |
| 2019/0320467 | A1 | 10/2019 | Freda et al. |
| 2021/0120581 | A1* | 4/2021 | Kim ............... H04W 76/27 |
| 2022/0022259 | A1* | 1/2022 | Atungsiri ............ H04L 1/08 |

OTHER PUBLICATIONS

First Notification of Office Action and Search Report issued by the China National Intellectual Property Administration for corresponding Chinese Patent Application No. 201980099118.5, mailed on Nov. 25, 2023, with an English translation.
International Search Report and Written Opinion of the International Searching Authority issued by the China National Intellectual Property Administration for corresponding International Patent Application No. PCT/CN2019/101111, mailed on May 8, 2020, with English translation.
Huawei et al., "Calculation of RA-RNTI", Agenda Item: 10.3.1.4.3, 3GPP TSG-RAN WG2 Meeting #99bis, R2-1710775, Revision of R2-1708968, Prague, Czech Republic, Oct. 9-13, 2017.
Vivo, "RA-RNTI Calculation for Extended RAR Window", Agenda Item: 11.2.1.1, 3GPP TSG-RAN WG2 Meeting #106, R2-1905621, Reno, USA, May 13-17, 2019.
3GPP TS 38.211 V15.6.0, Technical Specification, "3rd Generation Partnership Project; Technical Specification Group Radio Access Network", NR; Physical channels and modulation (Release 15), Jun. 2019.
3GPP TS 38.213 V15.6.0, Technical Specification, "3rd Generation Partnership Project; Technical Specification Group Radio Access Network", NR; Physical layer procedures for control (Release 15), Jun. 2019.
3GPP TS 38.321 V15.6.0, Technical Specification, "3rd Generation Partnership Project; Technical Specification Group Radio Access Network", NR; Medium Access Control (MAC) protocol specification (Release 15), Jun. 2019.
Extended European search report with the supplementary European search report and the European search opinion issued by the European Patent Office for corresponding European Patent Application No. 19942394.8-1216, mailed on Jun. 29, 2022.
Nokia et al., "2-step RACH Procedure Feature Lead Summary", Agenda Item: 7.2.1.2, 3GPP TSG-RAN WG1 Meeting #97, R1-1907726, Reno, USA, May 13-17, 2019.
Zte et al., "On 2-Step RACH Procedures", Agenda Item: 7.2.1.2, 3GPP TSG-RAN WG1 Meeting #96bis, R1-1903879, Xi'an, China, Apr. 8-12, 2019.
ZTE Corporation et al., "Consideration on 2-step RACH procedure", Agenda Item: 11.13, 3GPP TSG-WG2 Meeting #105-bis, R2-1903549, China, Xian, Apr. 8-12, 2019.
Notice of Reasons for Refusal issued by the Japan Patent Office for corresponding Japanese Patent Application No. 2022-507889, mailed on Feb. 28, 2023, with an English translation.
Catt, "Reception of Msg2 and msgB", Agenda Item: 11.13.4, 3GPP TSG-RAN WG2 Meeting #106, R2-1905754, Reno, USA, May 13-17, 2019.
The First Examination Report issued by the Indian Patent Office for corresponding Indian Patent Application No. 202237003307, mailed on Jan. 2, 2024, with an English translation.
Notice of Preliminary Rejection issued by the Korean Intellectual Property Office for corresponding Korean Patent Application No. 10-2022-7004378, mailed on Sep. 12, 2024, with an English translation.
ZTE Corporation et al., "Introduction of 2-step RACH", Change Request; Current version: 15.6.0, 3GPP TSG-RAN WG2 Meeting #107 R2-1909157, Prague, Czech Republic, Aug. 26-30, 2019.

* cited by examiner

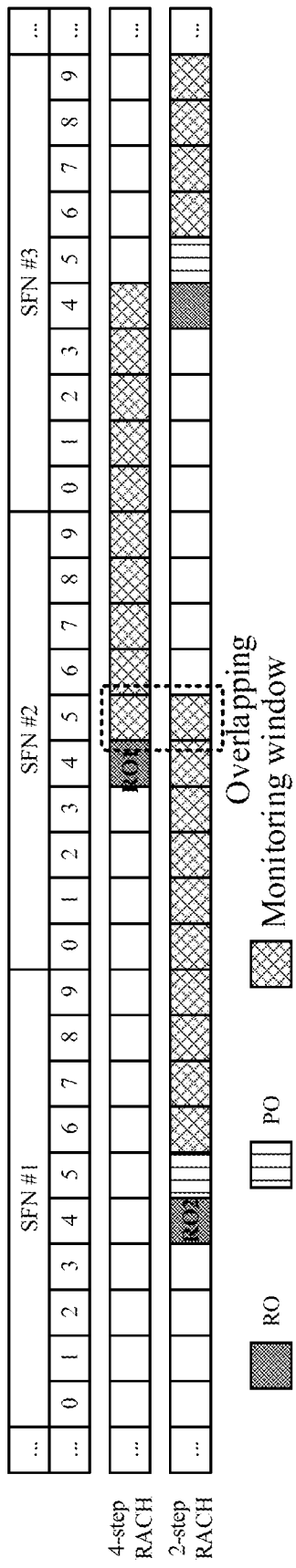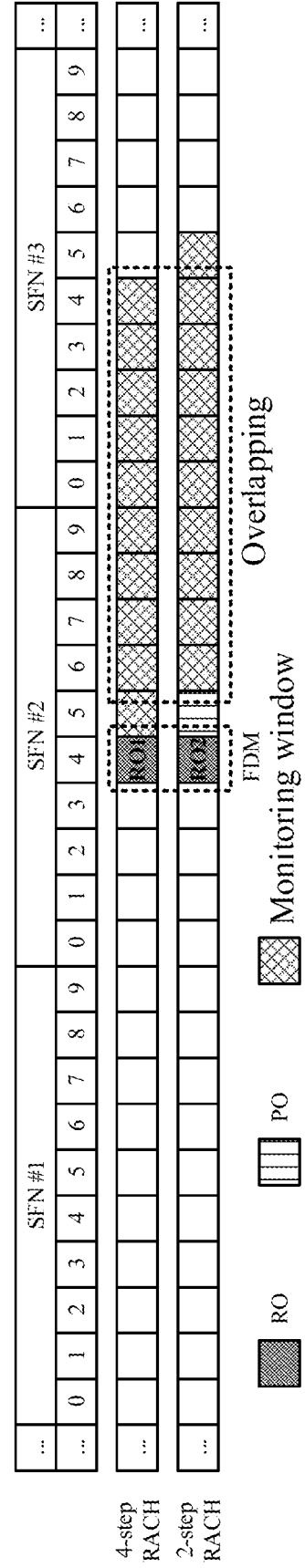
FIG. 4
FIG. 5

METHODS AND APPARATUSES FOR RECEIVING AND TRANSMITTING RANDOM ACCESS RESPONSE IN 2-STEP RANDOM ACCESS

CROSS-REFERENCE TO RELATED APPLICATION

This application is a continuation application of International Application PCT/CN2019/101111 filed on Aug. 16, 2019, and designated the U.S., the entire contents of which are incorporated herein by reference.

TECHNICAL FIELD

This disclosure relates to the field of communication technologies.

BACKGROUND

In a long term evolution (LTE) system of the 3rd Generation Partnership Project (3GPP), a user equipment needs to undergo procedures of cell search, system information (SI) acquisition, and random access, etc. in initially accessing a network. After the user equipment acquires downlink synchronization through cell search, it performs random access based on random access configuration and other information contained in the system information, thereby establishing connection with a cell and obtaining uplink synchronization.

FIG. 1 is a schematic diagram of a random access procedure of LTE, which is described by taking a contention-based random access procedure as an example, and includes at least the following four steps: transmitting a preamble, also referred to as Msg1, by a user equipment; feeding back a random access response (RAR), also referred to as Msg2, by a network device after receiving the preamble; transmitting Msg3 by the user equipment via a physical uplink shared channel (PUSCH); and feeding back Msg4 by the network device via a physical downlink shared channel (PDSCH). Such a random access procedure may be called 4-step random access (4-step RACH).

FIG. 2 is a schematic diagram of a random access procedure of NR (New Radio), which may be called a 2-step random access (2-step RACH). Compared with the conventional 4-step random access, the 2-step random access may access to the network more quickly. As shown in FIG. 2, during the 2-step random access, the user equipment transmits msgA, wherein msgA carries at least the preamble and Msg3 information in the 4-step random access; and the network device transmits msgB to the user equipment, wherein msgB at least carries Msg2 (RAR) and Msg4 information in the 4-step random access.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In the 4-step random access or the 2-step random access, a time-frequency resource available for transmitting a preamble is called a physical random access channel (PRACH) occasion, or RO for short. After transmitting the preamble, the user equipment detects Msg2 in the 4-step random access or msgB in the 2-step random access in a monitoring window to which its RO corresponds. In some application scenarios, there exists a situation where at least one user equipment using the 4-step random access and at least one user equipment using the 2-step random access coexist.

It was found by the inventors that no matter reception and transmission of Msg2 or msgB, an important demand for design is to avoid that a user equipment mistakenly deems a random access response (Msg2 or msgB) that is not for its own RO as its own random access response. In the 4-step random access, for downlink control information (DCI) scheduling Msg2, its cyclic redundancy check (CRC) is scrambled by using a random access (RA) radio network temporary identity (RA-RNTI). The RA-RNTI is determined by a time-frequency position of the RO, hence, an Msg2 is always for a certain RO. In the monitoring window (also referred to as an RAR window), by blindly detecting DCI with CRC scrambled by RA-RNTI, the user equipment may filter out Msg2 for other ROs (i.e. not an RO used by the user equipment itself), thereby avoiding mistakenly deeming Msg2 of an RO not for itself as Msg2 of itself.

For the 2-step random access, demands become more complicated, wherein it is required to avoid that a user equipment of the 2-step random access mistakenly deems MsgB of an RO not for itself as MsgB of itself, avoid that the user equipment of the 2-step random access mistakenly deems Msg2 of an RO not for itself as Msg2 of itself, and avoid that a user equipment of the 4-step random access mistakenly deems MsgB of an RO not for itself as Msg2 of itself. As the traditional method of RA-RNTI of the 4-step random access is unable to satisfy the above requirements of the 2-step random access, it is no longer applicable to 2-step random access.

In order to solve at least one of the above problems, embodiments of this disclosure provide methods and apparatuses for receiving and transmitting a random access response in the 2-step random access.

According to a first aspect of the embodiments of this disclosure, there is provided a method for receiving a random access response in the 2-step random access, applicable to a UE side, the method including: calculating a first RNTI, the first RNTI being different from an RA-RNTI actually used in the 4-step random access; using the first RNTI to detect downlink control information (DCI) scheduling a random access response in a monitoring window; and when the downlink control information is successfully detected, receiving the random access response in a physical downlink shared channel (PDSCH) according to the downlink control information.

According to a second aspect of the embodiments of this disclosure, there is provided a method for receiving a random access response in the 2-step random access, applicable to a UE side, the method including: calculating a first RNTI, wherein a value of the first RNTI is not greater than a maximum value of all possible values of an RA-RNTI of the 4-step random access; using the first RNTI to detect downlink control information (DCI) scheduling a random access response in a monitoring window; and when the downlink control information is successfully detected, receiving the random access response in a physical downlink shared channel according to the downlink control information.

According to a third aspect of the embodiments of this disclosure, there is provided a method for transmitting a random access response in the 2-step random access, applicable to a network device side, the method including: calculating a first RNTI, the first RNTI being different from an RA-RNTI actually used in the 4-step random access; using the first RNTI to scramble cyclic redundancy check (CRC) of downlink control information used for scheduling a random access response; and transmitting the downlink control information and the random access response.

According to a fourth aspect of the embodiments of this disclosure, there is provided a method for transmitting a random access response in the 2-step random access, applicable to a network device side, the method including: calculating a first RNTI, wherein a value of the first RNTI is not greater than a maximum value of all possible values of an RA-RNTI of the 4-step random access; using the first RNTI to scramble cyclic redundancy check of downlink control information used for scheduling a random access response; and transmitting the downlink control information and the random access response.

According to a fifth aspect of the embodiments of this disclosure, there is provided an apparatus for receiving a random access response in the 2-step random access, applicable to a UE side, the apparatus including: a first calculating unit configured to calculate a first RNTI, the first RNTI being different from an RA-RNTI actually used in the 4-step random access; a first detecting unit configured to use the first RNTI to detect downlink control information (DCI) scheduling a random access response in a monitoring window; and a first receiving unit configured to, when the downlink control information is successfully detected, receive the random access response in a physical downlink shared channel (PDSCH) according to the downlink control information.

According to a sixth aspect of the embodiments of this disclosure, there is provided an apparatus for receiving a random access response in the 2-step random access, applicable to a UE side, the apparatus including: a fourth calculating unit configured to calculate a first RNTI, wherein a value of the first RNTI is not greater than a maximum value of all possible values of an RA-RNTI of the 4-step random access; a fourth detecting unit configured to use the first RNTI to detect downlink control information scheduling a random access response in a monitoring window; and a second receiving unit configured to, when the downlink control information is successfully detected, receive the random access response in a physical downlink shared channel according to the downlink control information.

According to a seventh aspect of the embodiments of this disclosure, there is provided an apparatus for transmitting a random access response in the 2-step random access, applicable to a network device side, the apparatus including: a seventh calculating unit configured to calculate a first RNTI, the first RNTI being different from an RA-RNTI actually used in the 4-step random access; a first scrambling unit configured to use the first RNTI to scramble cyclic redundancy check (CRC) of downlink control information used for scheduling a random access response; and a first transmitting unit configured to transmit the downlink control information and the random access response.

According to an eighth aspect of the embodiments of this disclosure, there is provided an apparatus for transmitting a random access response in the 2-step random access, applicable to a network device side, the apparatus including: a tenth calculating unit configured to calculate a first RNTI, wherein a value of the first RNTI is not greater than a maximum value of all possible values of an RA-RNTI of the 4-step random access; a second scrambling unit configured to use the first RNTI to scramble cyclic redundancy check of downlink control information used for scheduling a random access response; and a second transmitting unit configured to transmit the downlink control information and the random access response.

According to a ninth aspect of the embodiments of this disclosure, there is provided a user equipment, including the apparatus as described in the fifth or sixth aspect of the embodiments of this disclosure.

According to a tenth aspect of the embodiments of this disclosure, there is provided a network device, including the apparatus as described in the seventh or eighth aspect of the embodiments of this disclosure.

According to an eleventh aspect of the embodiments of this disclosure, there is provided a communication system, including the user equipment as described in the ninth aspect of the embodiments of this disclosure and/or the network device as described in the tenth aspect of the embodiments of this disclosure.

According to a twelfth aspect of the embodiments of this disclosure, there is provided a computer readable program, which, when executed in an apparatus for receiving a random access response in the 2-step random access or a user equipment, will cause the apparatus for receiving a random access response in the 2-step random access or the user equipment to carry out the method for receiving a random access response in the 2-step random access as described in the first or second aspect of the embodiments of this disclosure.

According to a thirteenth aspect of the embodiments of this disclosure, there is provided a storing medium, including a computer readable program, which will cause an apparatus for receiving a random access response in the 2-step random access or a user equipment to carry out the method for receiving a random access response in the 2-step random access as described in the first or second aspect of the embodiments of this disclosure.

According to a fourteenth aspect of the embodiments of this disclosure, there is provided a computer readable program, which, when executed in an apparatus for transmitting a random access response in the 2-step random access or a network device, will cause the apparatus for transmitting a random access response in the 2-step random access or the network device to carry out the method for transmitting a random access response in the 2-step random access as described in the third or fourth aspect of the embodiments of this disclosure.

According to a fifteenth aspect of the embodiments of this disclosure, there is provided a storing medium, including a computer readable program, which will cause an apparatus for transmitting a random access response in the 2-step random access or a network device to carry out the method for transmitting a random access response in the 2-step random access as described in the third or fourth aspect of the embodiments of this disclosure.

An advantage of the embodiments of this disclosure exists in that by using an RNTI different from the RA-RNTI actually used in the 4-step random access to perform CRC scrambling on the DCI scheduling msgB, confusion of RNTIs in the 2-step random access may be avoided, that is, it may be not only avoided that a user equipment of the 2-step random access mistakenly deems MsgB of an RO not for itself as MsgB of an RO of itself, but also avoided that a user equipment of the 4-step random access mistakenly deems MsgB of an RO not for itself as Msg2 of an RO of itself.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 4 is a schematic diagram of an example of a random access procedure of an embodiment of this disclosure;

FIG. 5 is a schematic diagram of another example of the random access procedure of an embodiment of this disclosure;

DETAILED DESCRIPTION

Figure 1:
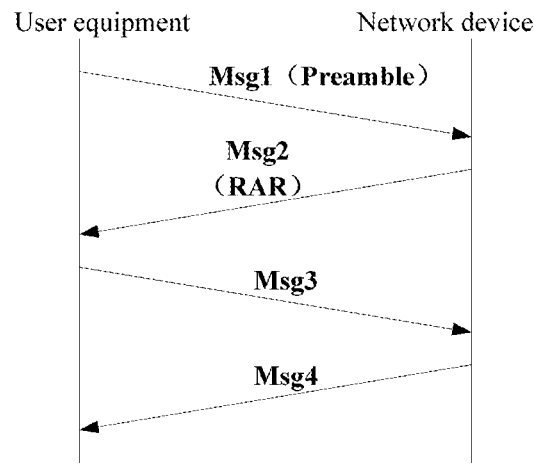
FIG. 1 is a schematic diagram of a random access procedure of LTE.

These and further aspects and features of this disclosure will be apparent with reference to the following description and attached drawings. In the description and drawings, particular embodiments of this disclosure have been disclosed in detail as being indicative of some of the ways in which the principles herein may be employed, but it is understood that this disclosure is not limited correspondingly in scope. Rather, this disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (genescalen), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Figure 3:
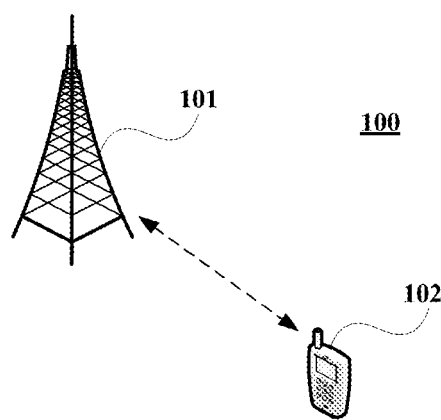
FIG. 3 is a schematic diagram of a communication system of an embodiment of this disclosure.

FIG. 3 is a schematic diagram of a communication system of an embodiment of this disclosure, in which a case where a user equipment and a network device are taken as examples is schematically shown. As shown in FIG. 3, a communication system 100 may include a network device 101 and a user equipment 102. For the sake of simplicity, an example having only one user equipment is schematically given in FIG. 3. The network device 101 is, for example, a network device gNB of NR.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (mMTC), and ultra-reliable and low-latency communication (URLLC), etc.

The terminal equipment 102 may transmit data to the network device 101, such as initiating a random access procedure, which may be 4-step random access (4-step RACH), or may be 2-step random access (2-step RACH).

In the 2-step random access, if an RA-RNTI in the 4-step random access is still used to perform CRC scrambling on DCI scheduling msgB, it may result in that a user equipment in the 2-step random access mistakenly deems msgB or Msg2 of an RO not for itself as msgB of an RO for itself, or result in that a user equipment in the 4-step random access mistakenly deems msgB of an RO not for itself as Msg2 of an RO for itself.

FIG. 4 is a schematic diagram of an example of the random access procedure of the embodiment of this disclosure. As shown in FIG. 4, it is assumed that unpaired spectrum or time division duplex (TDD) spectrum is used, and it is also assumed that a subcarrier spacing is 15 kHz and no SUL (supplementary uplink) carrier is configured. The ROs of 2-step RACH and 4-step RACH are multiplexed in a TDM manner.

Figure 2:
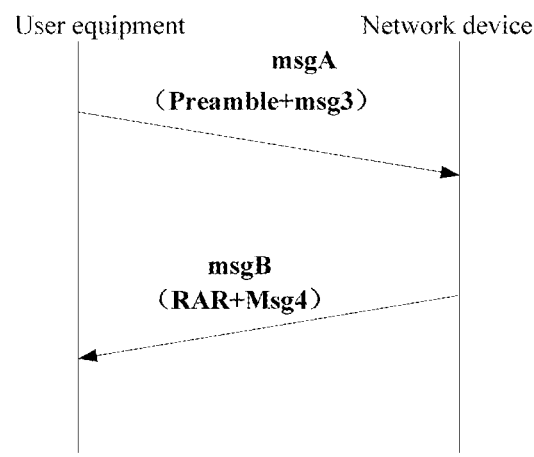
FIG. 2 is a schematic diagram of a random access procedure of NR (New Radio)

In the time domain, according to Table 6.3.3.2-3 of 3GPP TS 38.211 V15.6.0, the PRACH configuration index of 4-step RACH is configured as 5, and the PRACH configuration index of 2-step RACH is configured as 6. According to the above PRACH configuration, the RO of the 4-step RACH is located at a slot with an index 4 in an even-numbered system frame, and the RO of the 2-step RACH is located at a slot with an index of 4 in an odd-numbered system frame. In the frequency domain, there are no restriction on frequency resource configurations of 2-step RACH and 4-step RACH. For the sake of simplicity, FIG. 2 shows 2-step RACH and 4-step RACH having identical frequency resource indices, wherein definitions of the parameters may refer to subsection 6.3.3.2 of TS 38.211V15.6.0. Similar to the definition of RO, a PUSCH occasion is referred to as a PO in brief, which denotes a time-frequency resource of the PUSCH.

In FIG. 4, the PUSCH is located at an adjacent slot after the RO, and there is no restriction on a size and a position of the frequency domain resource of the PUSCH. Similar to the monitoring window in 4-step RACH (also referred to as an RAR window), 2-step RACH has an msgB monitoring window. The RAR monitoring window is located after the preamble, and the msgB monitoring window is located after the PUSCH (PO). For the sake of simplicity, an RAR monitoring window and an msgB monitoring window are collectively referred to as a monitoring window in FIG. 4. In FIG. 4, it is assumed that a length of the monitoring window is 10 milliseconds (ms), which is the largest configurable length of the monitoring window of 4-step RACH. As shown in FIG. 4, the monitoring window of 2-step RACH and the monitoring window of 4-step RACH overlap in timing. According to the RA-RNTI calculation method given in sub-section 5.1.3 of TS 38.321 V15.6.0, a value of an RA-RNTI takes 10 milliseconds as a period, hence, RO1 and RO2 in FIG. 2 will have identical RA-RNTIs, that is, confusion of RNTIs may occur. If 2-step RACH reuses the RA-RNTI, within a range of time when the two monitoring windows overlap, a user of 2-step RACH will mistakenly deem Msg2 (the Msg2 is for RO1) originally transmitted to a user of 4-step RACH as msgB transmitted to itself, and at the same time, the user of 4-step RACH will also mistakenly deem MsgB (the MsgB is for RO2) originally transmitted to the user of 2-step RACH as msg2 transmitted to itself. As RO1 and RO2 may use identical preambles, the users are unable to distinguish whether the preambles belong to 2-step RACH (corresponding to RO2) or 4-step RACH (corresponding to RO1) via an RAPID (random access preamble identifier, i.e. a preamble ID) in an MAC PDU.

FIG. 5 is a schematic diagram of another example of the random access procedure of an embodiment of this disclosure. The ROs of 2-step RACH and 4-step RACH are multiplexed in an FDM manner. More specifically, in the time domain, according to Table 6.3.3.2-3 of 3GPP TS 38.211 V15.6.0, the PRACH configuration index of 4-step RACH is configured as 5, and the PRACH configuration index of 2-step RACH is configured as 5. However, in the frequency domain, the ROs of 4-step RACH and 2-step RACH are configured to occupy different frequency resources, that is, they are multiplexed in the same slot in the FDM manner. Other parameter configurations are identical to those in FIG. 4. As 2-step RACH and 4-step RACH are independently configured, frequency resource indices n (or fid) of 2-step RACH and 4-step RACH are identified from 0. If 2-step RACH reuses the RA-RNTI calculation method, as 2-step RACH and 4-step RACH have identical frequency resource indices n (or fid), RO1 and RO2 will have identical RA-RNTIs, and confusion of RNTIs may occur in overlapped parts of the monitoring windows.

In the embodiment of this disclosure, the 4-step RACH only detects preambles, and in contrast, 2-step RACH needs not only to detect preambles, but also to demodulate and decode PUSCHs, hence, it requires longer processing time than the 4-step RACH. Therefore, the 2-step RACH may be configured with a monitoring window length larger than that of the 4-step RACH. A maximum monitoring window length of the 4-step RACH is 10 milliseconds, and a maximum monitoring window length of the 2-step RACH may be greater than the maximum monitoring window length of the 4-step RACH, that is, greater than 10 milliseconds. When the 2-step RACH monitoring window length is configured to be greater than the 4-step RACH maximum monitoring window length, as shown in FIG. 4, the monitoring window of the 2-step RACH and the monitoring window of the 4-step RACH will have more parts overlapping in timing. Therefore, reusing the RA-RNTI method of the 4-step RACH will also result in that a user of the 2-step RACH mistakenly deems Msg2 of a user of the 4-step RACH as msgB of an RO for itself, or a user of the 4-step RACH mistakenly deems MsgB of a user of the 2-step RACH as msgB of an RO for itself. In addition, when the 2-step RACH monitoring window length is configured to be greater than the 4-step RACH maximum monitoring window length, reusing the RA-RNTI method of the 4-step RACH will also result in that a user of the 2-step RACH mistakenly deems msgB of other users of the 2-step RACH as msgB of an RO for itself.

Figure 6:
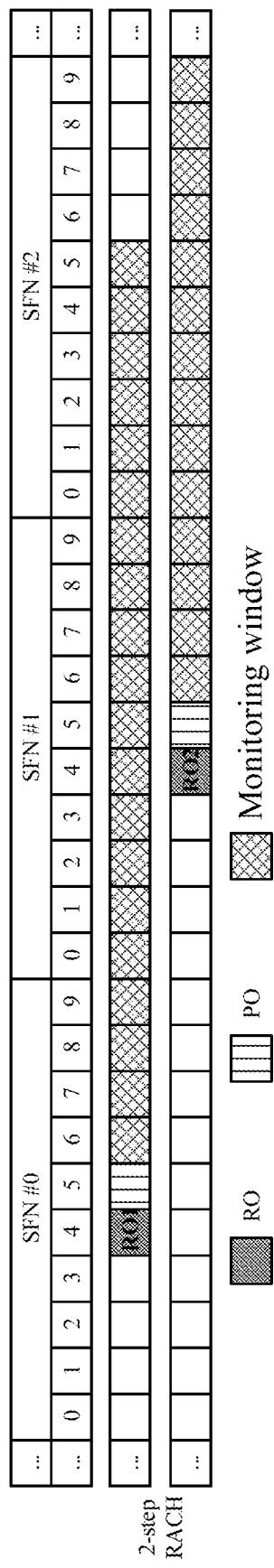
FIG. 6 is a schematic diagram of a further example of the random access procedure of an embodiment of this disclosure.

FIG. 6 is a schematic diagram of a further example of the random access procedure of an embodiment of this disclosure. In the time domain, according to Table 6.3.3.2-3 of 3GPP TS 38.211 V15.6.0, the PRACH configuration index of the 2-step RACH is configured as 12. According to the above PRACH configuration, the RO of the 2-step RACH is located at a slot with an index of 4 in each system frame. In the frequency domain, there is no restriction on the frequency resource configuration of the 2-step RACH. For the sake of simplicity, FIG. 6 shows 2-step RACHs with identical frequency resource indices. It is assumed in FIG. 6 that the length of the monitoring window is 20 ms, which is greater than a configurable maximum length of the monitoring window of the 4-step RACH, which is 10 ms. As shown in FIG. 6, two monitoring windows of the 2-step RACH overlap in timing. If the 2-step RACH reuses the RA-RNTI of the 4-step RACH, RO1 and RO2 in FIG. 6 will have identical RA-RNTI values, and within a range of time in which two monitoring windows overlap, the user of the 2-step RACH will mistakenly deem msgB originally transmitted to other users of the 2-step RACH as the msgB transmitted to itself. In summary, when the maximum monitoring window length of the 2-step RACH is greater than the maximum monitoring window length of the 4-step RACH, the method of reusing the RA-RNTI of the 4-step RACH may result in both confusion of RNTIs of the 2-step RACH and the 4-step RACH and confusion of RNTIs of the 2-step RACH itself.

Various implementations of the embodiments of this disclosure shall be described below with reference to the accompanying drawings. These implementations are illustrative only, and are not intended to limit this disclosure.

EMBODIMENT 1

The embodiments of this disclosure provide a method for receiving a random access response in the 2-step random access, applicable to a user equipment side.

Figure 7:
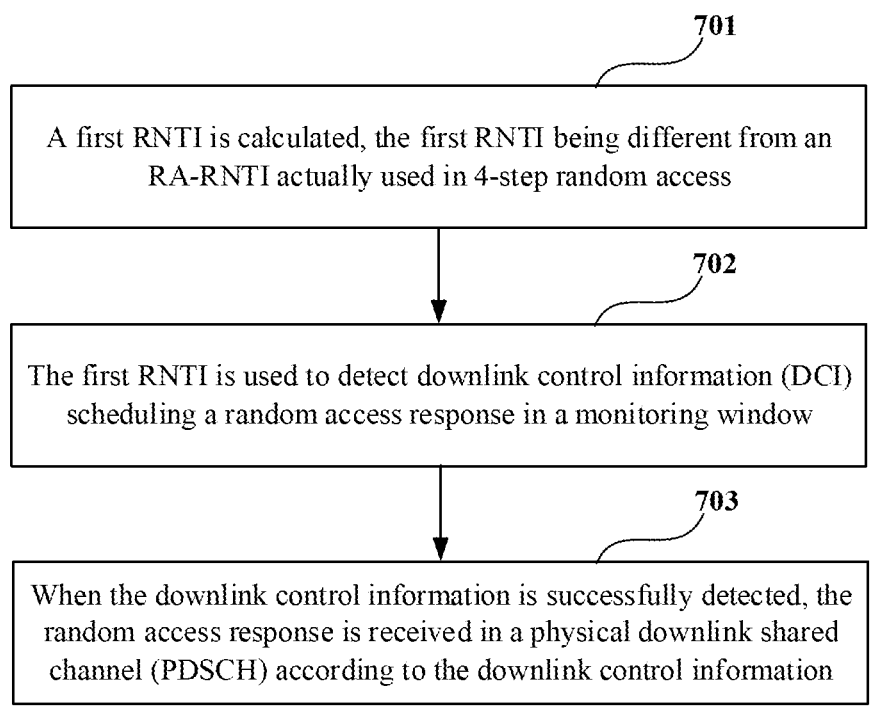
FIG. 7 is a schematic diagram of the method for receiving a random access response in the 2-step random access of Embodiment 1 of this disclosure.

FIG. 7 is a schematic diagram of the method for receiving a random access response in the 2-step random access of Embodiment 1 of this disclosure. As shown in FIG. 7, the method includes:

Step 701: a first RNTI is calculated, the first RNTI being different from an RA-RNTI actually used in the 4-step random access;

Step 702: the first RNTI is used to detect downlink control information (DCI) scheduling a random access response in a monitoring window; and Step 703: when the downlink control information is successfully detected, the random access response is received in a physical downlink shared channel (PDSCH) according to the downlink control information.

Thus, by using an RNTI different from the RA-RNTI actually used in the 4-step random access to perform CRC scrambling on the DCI scheduling msgB, it may avoid confusion of RNTIs in the 2-step random access, that is, it may be not only avoided that a user equipment of the 2-step random access mistakenly deems MsgB or Msg 2 of an RO not for itself as MsgB of an RO of itself, but also avoided that a user equipment of the 4-step random access mistakenly deems MsgB of an RO not for itself as Msg2 of an RO of itself.

In step 701, the first RNTI that is different from the RA-RNTI actually used in the 4-step random access is calculated, the first RNTI, for example, being denoted by msgB-RNTI.

As an example, that is, Example 1), msgB may be carried by an MAC PDU (i.e. a PDSCH). In this case, for example, the first RNTI may be calculated according to a second RNTI and an offset. For example, the first RNTI is calculated according to formula (1) below:

$$msgB\text{-}RNTI = \text{offset} + RA\text{-}RNTI_{2\text{-}step} \qquad (1);$$

where, msgB-RNTI denotes the first RNTI, offset denotes the offset, and $RA\text{-}RNTI_{2\text{-}step}$ denotes the second RNTI.

In this embodiment, the offset is used to avoid confusion between the msgB-RNTI of the 2-step random access and the RA-RNTI of the 4-step random access, and $RA\text{-}RNTI_{2\text{-}step}$ is used to avoid RNTI confusion in the 2-step random access. That is, a user equipment of the 2-step random access will not mistakenly deem Msg2 of the user equipment of four-step random access as msgB for its own RO, the user equipment of four-step random access will not mistakenly deem the MsgB of the user equipment of the 2-step random access as msg2 for its own RO, and the user equipment of the 2-step random access will not mistakenly deem msgB of other user equipments of the 2-step random access as the msgB for its own RO. In this embodiment, the offset may be configured by the network device.

For example, the offset may be configured by the network device in at least one of the following manners: a broadcast message; RRC signaling; and an MAC CE (MAC control element).

For example, the broadcast message may be system information SIB1 or MIB.

In the embodiments, a particular value of the offset is not limited.

For example, the offset may be greater than or equal to a value determined according to one of the following: a value range of the RA-RNTI; the value range of the RA-RNTI and configuration information of a second carrier; the value of the RA-RNTI range, the configuration information of the second carrier and first PRACH configuration information of the 4-step random access on the second carrier; and the configuration information of the second carrier, second PRACH configuration information of the 4-step random access on the second carrier and second PRACH configuration information of the 4-step random access on the first carrier.

In this embodiment, the RA-RNTI is an RA-RNTI of the 4-step random access. For example, the RA-RNTI may be obtained through calculation according to formula (2) below:

$$RA\text{-}RNTI_{4\text{-}step} = 1 + s\_id_{4\text{-}step} + 14 \times t\_id_{4\text{-}step} + 14 \times 80 \times f\_id_{4\text{-}step} + 14 \times 80 \times 8 \times ul\_carrier\_id_{4\text{-}step} \qquad (2);$$

where, $RA\text{-}RNTI_{4\text{-}step}$ denotes the RA-RNTI of the 4-step random access, $s\_id_{4\text{-}step}$ denotes an index of a first symbol where the RO of the 4-step random access is located, $0 \le s\_id_{4\text{-}step} < 14$, $t\_id_{4\text{-}step}$ denotes an index of a first slot where an RO in a system frame SFN is located, $0 \le t\_id_{4\text{-}step} < 80$, $f\_id_{4\text{-}step}$ denotes an index of a frequency resource where an RO is located in the frequency domain, $0 \le f\_id_{4\text{-}step} < 8$, up to 8 ROs being able to be configured in an FDM manner in the frequency domain, and $ul\_carrier\_id_{4\text{-}step}$ denotes an index of an uplink carrier used for preamble transmission of the 4-step random access, $0 \le ul\_carrier\_id_{4\text{-}step} < 2$, wherein when an NUL (normal uplink) carrier is used, $ul\_carrier\_id_{4\text{-}step} = 0$, and when an SUL (supplementary uplink) carrier is used, $ul\_carrier\_id_{4\text{-}step} = 1$.

In the embodiments, for example, the first carrier is an NUL (normal uplink) carrier, and the second carrier is an SUL (supplementary uplink) carrier.

For example, the offset is greater than or equal to a value determined according to the value range of the RA-RNTI, for example, it may be calculated according to formula (3) below:

$$\text{offset} \ge \max\{RA\text{-}RNTI \text{ that may be used for 4-step RACH}\} \qquad (3);$$

where, max{RA-RNTI that may be used for 4-step RACH} denotes a maximum value of the RA-RNTI that may be used for the 4-step random access, that is, the offset may be greater than or equal to the maximum value of all possible values of the RA-RNTI.

Substituting the above formula (3) and a range of related parameters into formula (3), following formula (4) is obtained:

$$\text{offset} \ge 14 \times 80 \times 8 \times 2 = 17920 \qquad (4);$$

where, 17920 is the maximum value of RA-RNTI that may be used in the 4-step random access, i.e. the maximum value of all possible values of the RA-RNTI.

In this way, by setting the offset to be greater than or equal to the maximum value (maximum feasible value) of all possible values of RA-RNTI of the 4-step RACH, a value range of msgB-RNTI of the 2-step RACH and a value range of the RA-RNTI of the 4-step RACH may be made non-overlapped by introducing the offset, thereby ensuring that that msgB-RNTI of the 2-step RACH and RA-RNTI of the 4-step RACH will not have identical values. As different RNTIs are used for msgB of the 2-step RACH and Msg2 of the 4-step RACH, a user of the 2-step RACH will not mistakenly deem Msg2 of a user of the 4-step RACH as msgB for its own RO, and the user of 4-step RACH will not mistakenly deem msgB of the 2-step RACH as Msg2 for its own RO.

Figure 8:
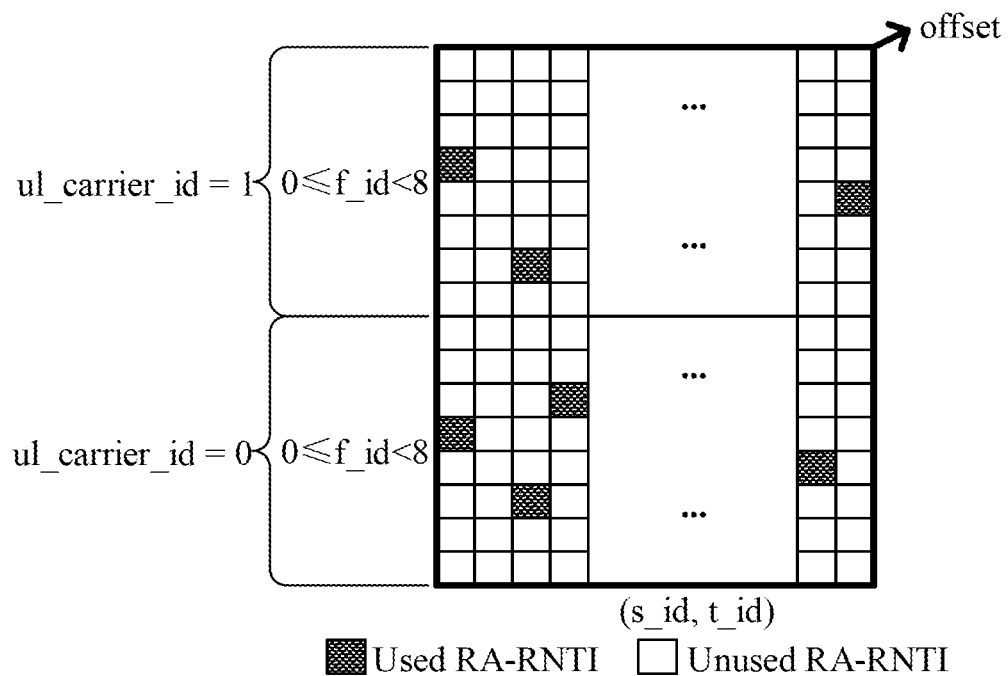
FIG. 8 is a schematic diagram of an offset of Embodiment 1 of this disclosure.

FIG. 8 is a schematic diagram of an offset of Embodiment 1 of this disclosure. As shown in FIG. 8, the value range of the RA-RNTI of the 4-step RACH is shown in the form of a two-dimensional graph. Each square in FIG. 8 denotes a possibly-used RA-RNTI value, which is in dependence on PRACH resource configuration, and not all RA-RNTIs will be used, and the filled squares denote RA-RNTIs that are actually used, thereby distinguishing available RA-RNTIs and actually-used RA-RNTIs. The RA-RNTI is uniquely determined by time indices (s_id, t_id), a frequency index (f_id) and a carrier index (ul_carrier_id) to which an RO corresponds, and a value of the RA-RNTI increases as the time indices (s_id, t_id) increases, the value of the RA-RNTI increases as the frequency index (f_id) increases and the value of the RA-RNTI increases as the carrier index (ul_carrier_id) increases. Formula (4) and formula (5) are equivalent to setting the offset to be greater than or equal to the maximum value of all possible values of the RA-RNTI, as shown in FIG. 8. It may be regarded that a minimum value of the offset takes a value space of all available RA-RNTIs as a granularity.

For another example, the offset is greater than or equal to a value determined according to the value range of the RA-RNTI and the configuration information of the second carrier, for example, it may be calculated according to formula (5) below:

$$\text{offset} \geq \begin{cases} \max\{RA-RNTI \text{ available in 4-step } RACH \text{ when } ul\_carrier\_id = 0\} & \text{if the } SUL \text{ carrier is not configured} \\ \max\{RA-RNTI \text{ available in 4-step } RACH\} & \text{Otherwise} \end{cases} \quad (5)$$

where, ul_carrier_id denotes an index of an uplink carrier used in transmitting a preamble, max{RA-RNTI available in 4-step RACH when ul_carrier_id=0} denotes a maximum value of all possible values of the RA-RNTI satisfying a condition that the index of the uplink carrier used in transmitting a preamble is 0, and max{RA-RNTI available in 4-step RACH} denotes a maximum value of an RA-RNTI available for the 4-step random access.

Substituting formula (3) and a range of related parameters into formula (5), formula (6) below is obtained:

$$\text{offset} \geq \quad (6)$$
$$\begin{cases} 14 \times 80 \times 8 = 8960 & \text{if the } SUL \text{ carrier is not configured} \\ 14 \times 80 \times 8 \times 2 = 17920 & \text{Otherwise} \end{cases} ;$$

where, 8960 is the maximum value of all possible values of the RA-RNTI satisfying a condition that the index of the uplink carrier used in transmitting a preamble is 0, and 17920 is the maximum value of an RA-RNTI available for the 4-step random access.

In this way, the user of the 2-step RACH may learn SUL carrier configuration information by receiving system information SIB1, the SUL carrier configuration information at least including whether an SUL carrier is configured. The above information may be used to further determine the value range of the RA-RNTI of the 4-step RACH. If the SUL carrier is not configured, according to the method in subsection 5.1.3 of TS 38.321 V15.6.0, as a value of ul_carrier_id may not be 1, the value range of the RA-RNTI of the 4-step RACH is determined to be 1~8960. At this moment, setting the offset to be greater than or equal to 8960 may avoid overlapping with the range of msgB-RNTI of the 2-step RACH; otherwise, if the SUL carrier is configured, the value range of the RA-RNTI of the 4-step RACH is determined to be 1~17920. At this moment, the offset needs to be set to be greater than or equal to 17920 to avoid overlapping with the value range of msgB-RNTI of the 2-step RACH. In this way, the user of the 2-step RACH will not mistakenly deem Msg2 of the user of the 4-step RACH as its own msgB, and the user of the 4-step RACH will not mistakenly deem msgB of the user of the 2-step RACH as its own Msg2.

Figure 9:
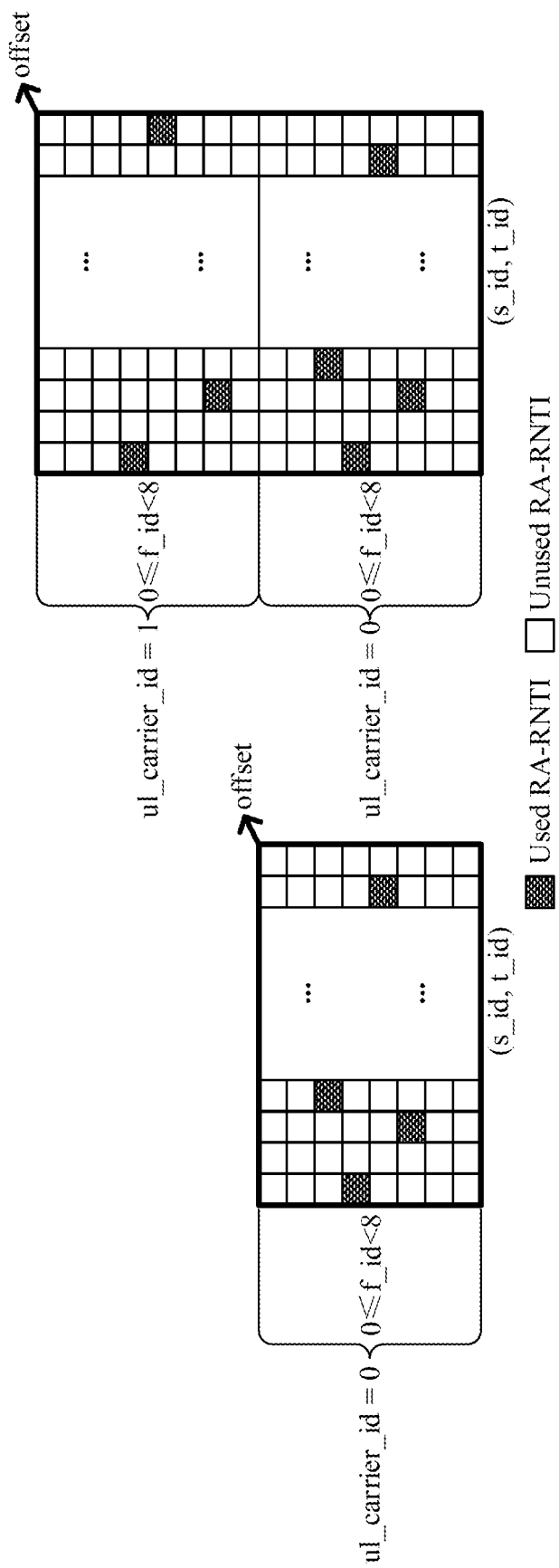
FIG. 9 is another schematic diagram of the offset of Embodiment 1 of this disclosure.

FIG. 9 is another schematic diagram of the offset of Embodiment 1 of this disclosure. As shown in FIG. 9, the diagram on the left shows that the offset is set to be greater than or equal to the maximum available RA-RNTI when ul_carrier_id=0 when there exists no SUL carrier, thereby avoiding overlapping and confusion of RNTIs; and the diagram on the right shows that the offset needs to be set to be greater than or equal to the maximum value of all available values of the RA-RNTI when there exists an SUL carrier. A minimum value that may be deemed as the offset takes ul_carrier_id (carrier) as a granularity. The offset of the diagram on the left of FIG. 9 is a value space of all available RA-RNTIs when the offset is greater than or equal to ul_carrier_id=0, and a minimum value of the offset of the diagram on the right of FIG. 9 takes a value space of all available RA-RNTIs when ul_carrier_id=0 and ul_carrier_id=1 as a granularity.

For another example, the offset is greater than or equal to a value determined according to the value range of the RA-RNTI, the configuration information of the second carrier and first PRACH configuration information of the 4-step random access on the second carrier. For example, it may be calculated according to formula (7) below:

$$\text{offset} \geq \quad (7)$$
$$\begin{cases} \max\{RA\text{-}RNTI \text{ that may be used by the 4-step } RACH \text{ when } ul\_carrier\_id = 0\} & \begin{array}{l}\text{If the } SUL \text{ carrier is not configured, or if the} \\ SUL \text{ carrier is configured but the } SUL \text{ carrier is not} \\ \text{configured the } PRACH \text{ resource of the 4-step } RACH\end{array} \\ \max\{4RA\text{-}RNTI \text{ that may be used by the 4-step } RACH\} & \text{Otherwise} \end{cases} ;$$

where, ul_carrier_id denotes an index of an uplink carrier used in transmitting a preamble, max{RA-RNTI available in 4-step RACH when ul_carrier_id=0} denotes a maximum value of all possible values of the RA-RNTI satisfying a condition that the index of the uplink carrier used in transmitting a preamble is 0, and max{RA-RNTI available in 4-step RACH} denotes a maximum value of an RA-RNTI available for the 4-step random access.

Substituting formula (2) and a range of related parameters into formula (7), the following formula (8) is obtained:

$$\text{offset} \geq \begin{cases} 14 \times 80 \times 8 = 8960 & \begin{array}{l}\text{If the } SUL \text{ carrier is not configured, or if the} \\ SUL \text{ carrier is configured but the } SUL \text{ carrier is not} \\ \text{configured the } PRACH \text{ resource of the 4-step } RACH\end{array} \\ 14 \times 80 \times 8 \times 2 = 17920 & \text{Otherwise} \end{cases} ; \quad (8)$$

where, 8960 is the maximum value of all possible values of the RA-RNTI satisfying a condition that the index of the uplink carrier used in transmitting a preamble is 0, and 17920 is the maximum value of an RA-RNTI available for the 4-step random access.

In this way, the user of the 2-step RACH may learn SUL carrier configuration information (at least including whether the SUL carrier is configured) by receiving system information SIB1, and may learn first PRACH configuration information of the 4-step RACH on the SUL carrier, the first PRACH configuration information at least including whether a PRACH resource of the 4-step RACH is configured. If the SUL carrier is not configured, or the SUL carrier is configured but the SUL carrier is not configured with a PRACH resource of the 4-step RACH, the value range of the RA-RNTI of the 4-step RACH is determined to be 1~8960, hence, the offset is set to be greater than or equal to 8960 to avoid overlapping with the value range of msgB-RNTI of the 2-step RACH; otherwise, the value range of the RA-RNTI of the 4-step RACH is determined to be 1~17920, at this moment, the offset needs to be set to be greater than or equal to 17920 to avoid overlapping with the value range of msgB-RNTI of the 2-step RACH. In this way, the user of the 2-step RACH will not mistakenly deem Msg2 of the user of the 4-step RACH as its own msgB, and the user of the 4-step RACH will not mistakenly deem msgB of the user of the2-step RACH as its own Msg2. See FIG. 9 for a visualized illustration of formula (7) and formula (8).

For another example, the offset is determined according to the configuration information of the second carrier, the second PRACH configuration information of the 4-step random access on the second carrier and the second PRACH configuration information of the 4-step random access on the first carrier. For example, the offset may be calculated according to formula (9) below:

RNTI the 2-step RACH; otherwise, the value range of the RA-RNTI of the 4-step RACH is determined to be 1~8960+ 1120×msg1-FDM$^{SUL}_{4\text{-}step}$ and at this moment, the offset is set to be greater than or equal to 8960+1120×msg1-FDM$^{SUL}_{4\text{-}step}$ thereby avoiding the overlapping of the value range of the RNTI of the 4-step RACH and the value range of the RNTI of the 2-step RACH. In this way, the user of the 2-step RACH will not mistakenly deem Msg2 of the user of the 4-step RACH as its own msgB, and the user of the 4-step RACH will not mistakenly deem msgB of the user of the 2-step RACH as its own Msg2.

Figure 10:
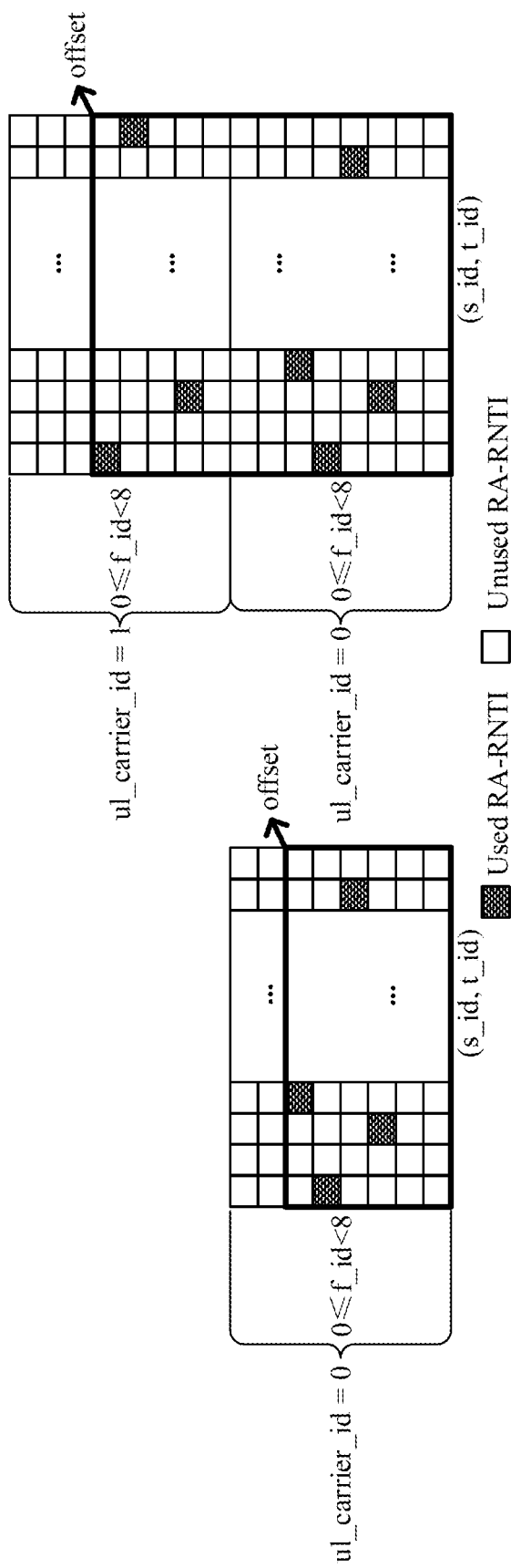
FIG. 10 is a further schematic diagram of the offset of Embodiment 1 of this disclosure.

FIG. 10 is a further schematic diagram of the offset of Embodiment 1 of this disclosure. As shown in FIG. 10, a minimum value of the offset takes f_id as a granularity, or in other words, "rows" in FIG. 10 are taken as granularities to perform the offset. The offset in the diagram on the left side of FIG. 10 is a "row" where an actually-used maximum RA-RNTI is located when the offset is greater than or equal to ul_carrier_id=0 (one carrier), and the offset in the diagram on the right side of FIG. 10 is a "row" where an actually-used maximum RA-RNTI is located when the offset is greater than or equal to ul_carrier_id=0 and ul_carrier_id=1 (two carriers). That is, the offset is greater than or equal to a maximum value of all possible values of the RA-RNTI satisfying a condition that an index of a frequency resource where an RO is located is equal to an index of a frequency resource to which the actually-used maximum RA-RNTI corresponds.

For another example, the offset is greater than or equal to a value determined according to the configuration informa- $$\text{offset} \geq \begin{cases} 14 \times 80 \times msg1\text{-}FDM^{NUL}_{4\text{-}step} = 1120 \times msg1\text{-}FDM^{NUL}_{4\text{-}step} & \text{If the } SUL \text{ carrier is not configured, or if the } SUL \text{ carrier is configured but the } SUL \text{ carrier is not configured the } PRACH \text{ resource of the 4-step } RACH \\ 14 \times 80 \times 8 + 14 \times 80 \times msg1\text{-}FDM^{NUL}_{4\text{-}step} = 8960 + 2230 \times msg1\text{-}FDM^{NUL}_{4\text{-}step} & \text{Otherwise} \end{cases} \quad (9)$$

where, msg1-FDM$^{NUL}_{4\text{-}step}$ denotes an msg1-FDM parameter in the PRACH resource configuration of the 4-step RACH of the NUL carrier, and msg1-FDM$^{SUL}_{4\text{-}step}$ denotes an msg1-FDM parameter in the PRACH resource configuration of the 4-step RACH of the SUL carrier, a value of msg1-FDM being one of 1, 2, 4 and 8, which is used to indicate the number of ROs that are multiplexed in the FDM manner in the frequency domain.

In this way, the user of the 2-step RACH may learn the SUL carrier configuration information (at least including whether the SUL carrier is configured) by receiving system information SIB1, and may obtain the second PRACH configuration information of the 4-step RACH on the NUL and/or SUL carrier. Here, the second PRACH configuration information at least includes whether the PRACH resource of the 4-step RACH is configured and specific PRACH resource configuration of the 4-step RACH. The PRACH resource configuration includes a high layer parameter msg1-FDM. The above information may be used to further determine the value range of the RA-RNTI of the 4-step RACH. If the SUL carrier is not configured, or the SUL carrier is configured but the SUL carrier is not configured with the PRACH resource of the 4-step RACH, the value range of the RA-RNTI of the 4-step RACH is determined to be 1~1120×msg1-FDM$^{NUL}_{4\text{-}step}$, and at this moment, the offset is set to be greater than or equal to 1120×msg1-FDM$^{NUL}_{4\text{-}step}$, thereby avoiding the overlapping of the value range of the RNTI 4-step RACH and the value range of the tion of the second carrier, the second PRACH configuration information of the 4-step random access on the second carrier and the second PRACH of the 4-step random access on the first carrier. For example, the offset may be calculated according to formula (10) below:

offset≥max{the RA-RNTI actually used by 4-step RACH}  (10);

where, max{the RA-RNTI actually used by 4-step RACH} denotes the actually-used maximum RA-RNTI.

In this way, the user of the 2-step RACH may learn the SUL carrier configuration information by receiving system information SIB1, the SUL carrier configuration information at least including whether the SUL carrier is configured, and may obtain the second PRACH configuration information of the 4-step RACH on the NUL and/or SUL carrier, the second PRACH configuration information at least including whether the PRACH resource of the 4-step RACH is configured and the specific PRACH resource configuration of the 4-step RACH. The PRACH resource configuration contains all necessary information for calculating the RA-RNTI of the 4-step RACH. According to the PRACH resource configuration, the user of the 2-step RACH may obtain all values of the RA-RNTIs that have been used by the 4-step RACH in a current period, hence, it may be selected that the offset is greater than or equal to a maximum value in all values of the RA-RNTI, which may avoid overlapping of the value ranges of the RNTIs of the 2-step RACH and the RNTIs of the 4-step RACH. In this way, the user of the 2-step RACH will not mistakenly deem Msg2 of the user of the 4-step RACH as its own msgB, and the user of the 4-step RACH will not mistakenly deem msgB of the user of the 2-step RACH as its own Msg2.

Figure 11:
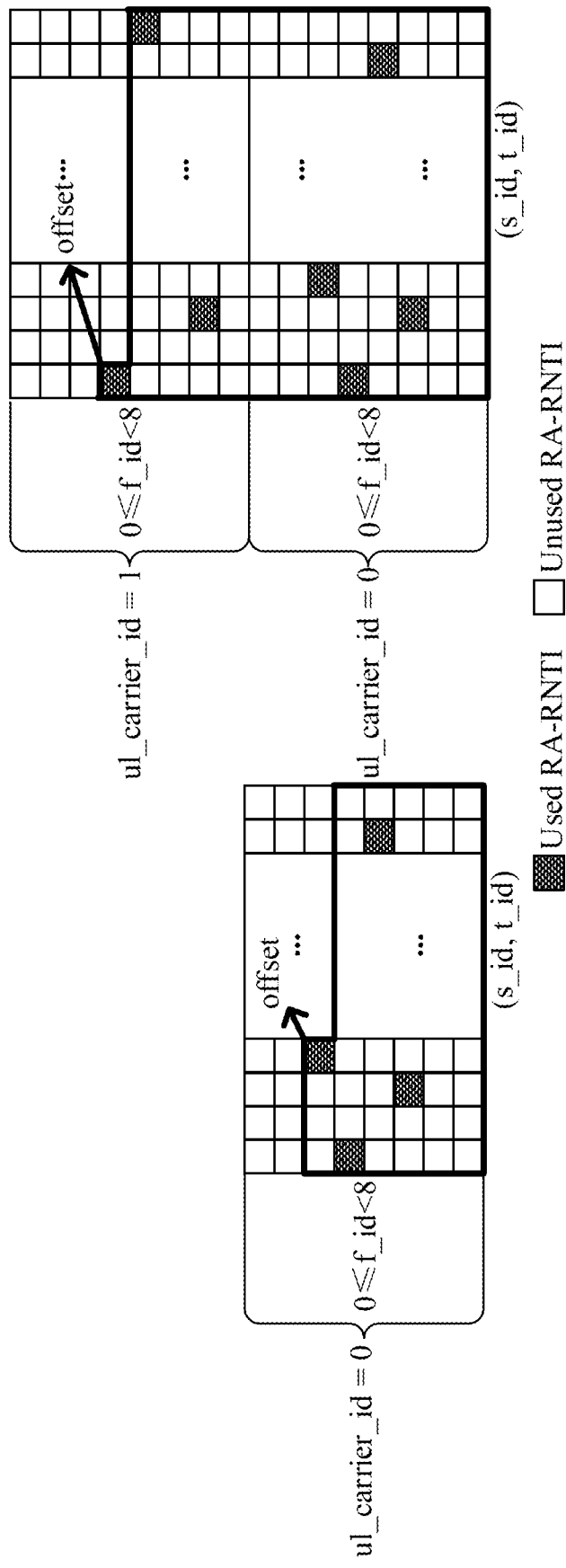
FIG. 11 is still another schematic diagram of the offset of Embodiment 1 of this disclosure.

FIG. 11 is still another schematic diagram of the offset of Embodiment 1 of this disclosure. As shown in FIG. 11, a minimum value of the offset takes squares in FIG. 11 as granularities. The offset of the diagram on the left of FIG. 11 is a "square" where the actually-used maximum RA-RNTI is located when the offset is greater than or equal to ul_carrier_id=0 (one carrier), and the offset of the diagram on the right of FIG. 11 is a "square" where the actually-used maximum RA-RNTI is located when the offset is greater than or equal to ul_carrier_id=0 and ul_carrier_id=1 (two carriers). In other words, the offset is greater than or equal to the actually-used maximum RA-RNTI.

Above, the method for determining the offset is illustrated above.

Hereinafter, a method for determining the second RNTI shall be illustrated according to a relationship between a length of the monitoring window (which may be referred to as an msgB monitoring window) of the 2-step random access and a length of the monitoring window of the 4-step random access.

For example, for the case where the maximum length of the monitoring window (msgB monitoring window) of the 2-step random access is not greater than the maximum length of the 4-step random access, the second RNTI is determined according to an index of a first symbol where the RO of the 2-step random access is located, an index of a first slot where the RO of the 2-step random access is located in a system frame, an index of a frequency resource where the RO of the 2-step random access is located, and an index of an uplink carrier used in transmitting a preamble.

For example, the second RNTI may be calculated with reference to the RA-RNTI of the 4-step random access.

For example, similar to the form of formula (2), the second RNTI may be calculated according to formula (11) below:

$$RA\text{-}RNTI_{2\text{-}step} = 1 + s\_id_{2\text{-}step} + 14 \times t\_id_{2\text{-}step} + 14 \times 80 \times f\_id_{2\text{-}step} + 14 \times 80 \times 8 \times ul\_carrier\_id_{2\text{-}step} \quad (11)$$

where, $RA\text{-}RNTI_{2\text{-}step}$ denotes the second RNTI, $s\_id_{2\text{-}step}$ denotes the index of the first symbol where the RO of the 2-step random access is located, $0 \leq s\_id_{2\text{-}step} < 14$, $t\_id_{2\text{-}step}$ denotes the index of the first slot where the RO of the 2-step random access is located in the system frame SFN, $0 \leq t\_id_{2\text{-}step} < 80$, $f\_id_{2\text{-}step}$ denotes the index of the frequency resource where the RO of the 2-step random access is located in the frequency domain, $0 \leq f\_id_{2\text{-}step} < 8$, wherein up to 8 ROs may be configured in the FDM manner in the frequency domain, and $ul\_carrier\_id_{2\text{-}step}$ denotes the index of the uplink carrier used for the 2-step random access preamble transmission, when an NUL (normal uplink) carrier is used, $ul\_carrier\_id_{2\text{-}step} = 0$, and when an SUL (supplementary uplink) carrier is used, $ul\_carrier\_id_{2\text{-}step} = 1$.

For example, substituting formula (11) and formula (3) into formula (1), following formula (12) is obtained:

$$msgB\text{-}RNTI \geq 1 + s\_id_{2\text{-}step} + 14 \times t\_id_{2\text{-}step} + 14 \times 80 \times (f\_id_{2\text{-}step} + 16) + 14 \times 80 \times 8 \times ul\_carrier\_id_{2\text{-}step} \quad (12)$$

where, reference may be made to formula (11) and formula (3) for meanings of the parameters, which shall not be repeated herein any further.

For another example, substituting formula (11) and formula (5), or substituting formula (11) and formula (7) into formula (1), following formula (13) is obtained:

$$MSGB\text{-}RNTI \geq \begin{cases} 1 + s\_id_{2\text{-}step} + 14 \times t\_id_{2\text{-}step} + 14 \times 80 \times (f\_id_{2\text{-}step} + 8); & \text{satisfying condition 1 or 2} \\ 1 + s\_id_{2\text{-}step} + 14 \times t\_id_{2\text{-}step} + 14 \times 80 \times (f\_id_{2\text{-}step} + 16)14 \times 80 \times 8 \times ul\_carrier\_id_{2\text{-}step}; & \text{Otherwise} \end{cases} \quad (13)$$

where, condition 1 is "if the SUL carrier is not configured", condition 2 is "if the SUL carrier is not configured, or if the SUL carrier is configured but the SUL carrier is not configured the PRACH resource of the 4-step RACH", and reference may be made to formula (11) for meanings of other parameters, which shall not be repeated herein any further.

For another example, substituting formula (11) and formula (9) into formula (1), following formula (14) is obtained:

$$msgB - RNTI \geq \begin{cases} 1 + s\_id_{2\text{-}step} + 14 \times t\_id_{2\text{-}step} + 14 \times 80 \times (f\_id_{2\text{-}step} + msg1\text{-}FDM_{4\text{-}step}^{NUL}) & \text{If the SUL carrier is not configured, or if the SUL carrier is configured but the SUL carrier is not configured the PRACH resource of the 4-step RACH}; \\ 1 + s\_id_{2\text{-}step} + 14 \times t\_id_{2\text{-}step} + 14 \times 80 \times (f\_id_{2\text{-}step} + msg1\text{-}FDM_{4\text{-}step}^{SUL}) + \\ 14 \times 80 \times 8 \times ul\_carrier\_id_{2\text{-}step} & \text{Otherwise} \end{cases} \quad (14)$$

where, reference may be made to formula (11) and formula (9) for meanings of other parameters, which shall not be repeated herein any further.

For example, for the case where the maximum length of the monitoring window (msgB monitoring window) of the 2-step random access is greater than the maximum length of the monitoring window of the 4-step random access, the second RNTI is determined according to the index of first symbol where the RO of the 2-step random access is located, the index of the first slot where the RO of the 2-step random access is located in a system frame, the index of the frequency resource where the RO of the 2-step random access is located, the index of the uplink carrier used in transmitting a preamble, a system frame index and the maximum monitoring window length to which the subcarrier interval corresponds, or the second RNTI or the fifth RNTI is determined according to the index of the first symbol where the RO of the 2-step random access is located, the index of the first slot where the RO of the 2-step random access is located in a system frame, the index of the frequency resource where the RO of the 2-step random access is located, the index of the uplink carrier used in transmitting a preamble, a system frame index and the maximum monitoring window length.

In this embodiment, for example, 10240 may be evenly divided by the maximum monitoring window length in milliseconds.

For example, for $W^\mu_{max}$ or $W_{max}$, there may be following restrictions that: it needs to satisfy that 10240 is an integer multiple of $W^\mu_{max}$ or $W_{max}$, or 10240 may be evenly divided by $W^\mu_{max}$ or $W_{max}$. This is because a SFN index range is 0~1023, that is, a SFN cycle is 10240 ms; if 10240 is not an integer multiple of $W^\mu_{max}$ or $W_{max}$, when a current SFN index is 1023 and a next SFN index is 0, there will exist t_id_new with a count less than a period in SFN#1023, it will cause that an interval between SFN#1023 and the next SFN#0 with an identical t_id_new is less than W. Therefore, two monitoring windows to which two ROs located at the two t_id_new correspond will overlap, and RNTI confusion may still occur in the overlapped part. Or, there may be following restrictions for $W^\mu_{max}$ or $W_{max}$ that: for slots with the number of counts less than one cycle (W), these slots will not be used for transmitting a preamble (that is, they will not be used as ROs). As an RO that may cause ambiguity is not used, RNTI confusion may also be avoided.

For example, the second RNTI may be calculated according to formula (15) below:

$$RA\text{-}RNTI_{2\text{-}step}=1+s\_id_{2\text{-}step}+14\times t\_id\_new+14\times W\times f\_id_{2\text{-}step}+14\times W\times 8\times ul\_carrier\_id_{2\text{-}step}$$

$$W=2^\mu \times W^\mu_{max},$$

$$t\_id\_new=\mathrm{mod}(t\_id_{2\text{-}step}+2^\mu \times 10\times SFN\_id, W) \quad (15);$$

where, meanings of $s\_id_{2\text{-}step}$, $t\_id_{2\text{-}step}$ and $ul\_carrier\_id_{2\text{-}step}$ are identical to those in formula (11), which shall not be repeated herein any further; $\mu=0, 1, 2, 3$ denotes that, values of $\mu$ to which subcarrier spacings of 15 kHz, 30 kHz, 60 kHz and 120 kHz correspond are 0, 1, 2, 3, respectively, and reference may be made to sub-section 5.1.3 of TS 38.321 V15.6.0 for a strict definition of $\mu$; $W^\mu_{max}$ denotes a maximum monitoring window length to which a subcarrier interval of $15\times 2^\mu$ kHz corresponds, and $W^\mu_{max}$ is in ms, which is greater than the maximum monitoring window length of the 4-step RACH (such as 10 milliseconds), and different subcarrier intervals having independent maximum monitoring window lengths $W^\mu_{max}$, W denotes the number of slots contained in the monitoring window, SFN_id denotes the SFN index, 0≤SFN_id<1024, t_id_new denotes a slot number in the monitoring window, 0≤t_id_new<W, that is, the period is W, and $RA\text{-}RNTI_{2\text{-}step}$ may avoid occurrence of RNTI confusion in the 2-step RACH.

$RA\text{-}RNTI_{2\text{-}step}$ in formula (15) is related to $\mu$, and $\mu$ is used in the calculation of $RA\text{-}RNTI_{2\text{-}step}$. Taking FIG. 6 as an example, for each variable in formula (15), variables t_id_new to which RO1 and RO2 correspond are 4 and 14, respectively, and other variables to which RO1 and RO2 correspond are identical. Therefore, $RA\text{-}RNTI_{2\text{-}step}$ calculated for RO1 and RO2 are different, thereby avoiding RNTI confusion in the 2-step RACH. Formula (1) further avoids confusion between RNTIs of the 2-step RACH and the 4-step RACH through the offset. By using formula (1) and formula (15), not only confusion between RNTIs of the 2-step RACH and the 4-step RACH may be avoided, but also confusion between RNTIs of the 2-step RACH itself may be avoided. In other words, not only the user of the 2-step RACH may be prevented from receiving msgB transmitted to other users of the 2-step RACH and/or Msg2 transmitted to the user of the 4-step RACH, but also the user of the 4-step RACH may be prevented from receiving msgB transmitted to other users of the 2-step RACH.

In this embodiment, $RA\text{-}RNTI_{2\text{-}step}$ may be calculated irrelevant to $\mu$. For example, substituting $\mu=3$ into formula (15), formula (16) below is obtained:

$$RA\text{-}RNTI_{2\text{-}step}=1+s\_id_{2\text{-}step}+14\times t\_id\_new+14\times W\times f\_id_{2\text{-}step}+14\times W\times 8\times ul\_carrier\_id_{2\text{-}step}$$

$$W=8\times W_{max},$$

$$t\text{-}id\_new=\mathrm{mod}(t\_id_{2\text{-}step}+80\times SFN\_id, W) \quad (16);$$

where, reference may be made to formula (15) for meanings of the parameter, which shall not be repeated herein any further.

In this way, different subcarrier intervals have identical maximum monitoring window lengths. Therefore, $RA\text{-}RNTI_{2\text{-}step}$ of formula (16) is irrelevant to $\mu$, and the resultant effect is similar to those above, which shall not be repeated herein any further.

The method for determining the second RNTI is exemplarily described above according to the relationship between the monitoring window length of the 2-step random access and the monitoring window length of the 4-step random access.

In the embodiments, the first RNTI is calculated in step 701, and in step 702, the first RNTI is used in the monitoring window to detect the downlink control information (DCI) scheduling the random access response.

Reference may be made to related relevant art for a particular detection method.

In step 703, when the DCI is successfully detected, the random access response is received on the PDSCH according to the DCI.

As example 1), the method of how to receive the random access response when msgB is carried by one MAC PDU is described above.

As another example, that is, Example 2), how to receive the random access response when msgB is carried by two MAC PDUs (i.e. two PDSCHs) shall be described below.

For example, msgB is divided into fallbackRAR (or Msg2-like msgB) and successRAR (or Msg4-like msgB). For 2-step RACH, when the network device detects existence of a preamble but fails in correctly demodulating and decoding a PUSCH associated with the preamble, the network device transmits fallbackRAR to instruct the user of the 2-step random access to transmit Msg3, which is equivalent to fall back to 4-step random access; and when the network device detects the existence of the preamble and correctly demodulating and decoding the PUSCH associated with the preamble, the network device transmits successRAR to indicate successful access of the user of the 2-step random access.

In this case, two RNTIs (denoted as msgB-RNTI-1 and msgB-RNTI-2, for example) are used for fallbackRAR and successRAR, respectively. Actually, for the above case where msgB is carried by one MAC PDU, it is equivalent to that fallbackRAR and successRAR are carried by one MAC PDU. When 2-step random access uses an RO different from that of the 4-step random access, and when msgB is carried by two MAC PDUs, although fallbackRAR of the 2-step random access is very similar to Msg2 of the 4-step random access, both of them cannot be carried in one MAC PDU (so that both of them use identical RNTIs, such as the RA-RNTI of the 4-step random access). This is because when 2-step random access uses an RO different from that of the 4-step random access (such as RO1 and RO2 in FIG. 4), 2-step random access may use a preamble identical to that of the 4-step random access (i.e. identical RAPIDs), the user is unable to distinguish between 2-step random access and 4-step random access via the RAPID in the MAC PDU, thereby resulting in ambiguity. Therefore, fallbackRAR also needs to use an RNTI different from the RA-RNTI of the 4-step random access. And msgB-RNTI-1 and msgB-RNTI-2 are used for fallbackRAR and successRAR, respectively.

For example, the first RNTI includes a third RNTI and/or a fourth RNTI.

Figure 12:
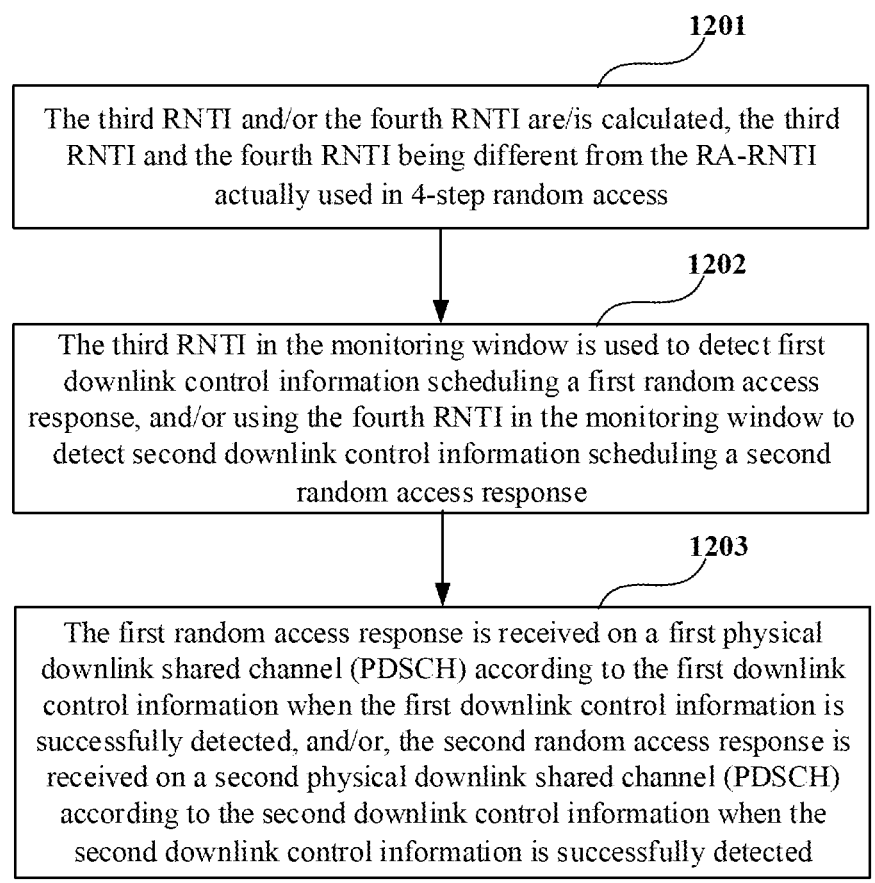
FIG. 12 is another schematic diagram of the method for receiving a random access response in the 2-step random access of Embodiment 1 of this disclosure.

FIG. 12 is another schematic diagram of the method for receiving a random access response in the 2-step random access of Embodiment 1 of this disclosure. As shown in FIG. 12, the method includes:

Step 1201: the third RNTI and/or the fourth RNTI are/is calculated, the third RNTI and the fourth RNTI being different from the RA-RNTI actually used in the 4-step random access;

Step 1202: the third RNTI in the monitoring window is used to detect first downlink control information scheduling a first random access response, and/or using the fourth RNTI in the monitoring window to detect second downlink control information scheduling a second random access response; and Step 1203: the first random access response is received on a first physical downlink shared channel (PDSCH) according to the first downlink control information when the first downlink control information is successfully detected, and/or, the second random access response is received on a second physical downlink shared channel (PDSCH) according to the second downlink control information when the second downlink control information is successfully detected.

In the embodiments, the third RNTI may be expressed as msgB-RNTI-1, and the fourth RNTI may be expressed as msgB-RNTI-2.

In step 1201, for example, the third RNTI is calculated according to a fifth RNTI and a first offset, and/or the fourth RNTI is calculated according to the fifth RNTI, the first offset and a second offset.

For example, the third RNTI and the fourth RNTI may be calculated according to formula (17) and formula (18) below:

$$msgB\text{-}RNTI\text{-}1 = \text{offset1} + RA\text{-}RNTI_{2\text{-}step} \quad (17),$$

$$msgB\text{-}RNTI\text{-}2 = \text{offset1} + \text{offset2} + RA\text{-}RNTI_{2\text{-}step} \quad (18);$$

where, msgB-RNTI-1 denotes the third RNTI, msgB-RNTI-2 denotes the fourth RNTI, offset1 denotes the first offset, offset2 denotes the second offset, and $RA\text{-}RNTI_{2\text{-}step}$ denotes the fifth RNTI.

In this embodiment, msgB-RNTI-1 is used for fallback-RAR, and msgB-RNTI-2 is used for successRAR, or, msgB-RNTI-1 is used for successRAR, and msgB-RNTI-2 is used for fallbackRAR.

In this way, not only confusion between the RNTIs of the 2-step RACH and the 4-step RACH may be avoided, but also confusion of RNTIs of 2-step RACH itself may be avoided. In the embodiments, the first offset offset1 and the second offset offset2 may be configured by the network device.

For example, the first offset offset1 and the second offset offset2 may be configured by the network device via at least one of the following methods: a broadcast message, RRC signaling; and an MAC CE (MAC control element).

For example, the broadcast message may be system information SIB1 or MIB.

In the embodiments, specific values of the first offset offset1 and the second offset offset2 are not limited.

For example, a method for determining the first offset offset1 may be identical to the method for determining the offset in example 1) above.

For example, the first offset offset1 may be greater than or equal to a value determined according to one of the following: the value range of the RA-RNTI; the value range of the RA-RNTI and the configuration information of the second carrier; the value of the RA-RNTI, the configuration information of the second carrier and the first PRACH configuration information of the 4-step random access on the second carrier; the configuration information of the second carrier, the second PRACH configuration of the 4-step random access on the second carrier information and the second PRACH configuration information of the 4-step random access on the first carrier.

For example, the first offset offset1 may be calculated according to any one of formulae (3) to (10) in the above example 1).

In this embodiment, a method for determining the second offset offset2 may be similar to the method for determining the offset above; however, corresponding parameters in the 4-step random access need to be replaced with parameters in the 2-step random access in the calculation.

For example, the second offset is greater than or equal to a value determined according to one of the following: a value range of the fifth RNTI; the value range of the fifth RNTI and the configuration information of the second carrier; the value range of the fifth RNTI, the configuration information of the second carrier and the first PRACH configuration information of the 2-step random access on the second carrier; the configuration information of the second carrier, the second PRACH configuration of the 2-step random access on the second carrier information and the second PRACH configuration information of the 2-step random access on the first carrier.

That is, the second offset is greater than or equal to one of the following values: a maximum value of all possible values of the fifth RNTI; a maximum value of all possible values of the fifth RNTI satisfying a condition that an index of an uplink carrier used for transmitting preamble is zero; a maximum value of all possible values of the fifth RNTI satisfying a condition that an index of a frequency resource where an RO is located is equal to an index of a frequency resource to which an actually-used maximum fifth RNTI corresponds; and the actually-used maximum fifth RNTI.

For example, similar to formulae (3), (5), (7), (9) and (10) in the above example 1), the second offset is calculated according to following formulae (19), (20), (21), (22) and (23):

$$\text{offset2} \geq \max\{RA\text{-}RNTI_{2\text{-}step} \text{ that may be used by the 2-step RACH}\}, \qquad (19)$$

$$\text{offset2} \geq \begin{cases} \max\{RA\text{-}RNTI_{2\text{-}step} \text{ that may be used by the 2-step RACH when } ul\_carrier\_id = 0\} & \text{If the } SUL \text{ is not configured} \\ \max\{RA\text{-}RNTI_{2\text{-}step} \text{ that may be used by the 2-step RACH}\} & \text{Otherwise} \end{cases}, \qquad (20)$$

$$\text{offset2} \geq \begin{cases} \max\{RA\text{-}RNTI_{2\text{-}step} \text{ that may be used by the 2-step RACH} & \text{If the } SUL \text{ carrier is not configured, or if the} \\ \text{when } ul\_carrier\_id = 0\} & SUL \text{ carrier is configured but the } SUL \text{ carrier is not} \\ \max\{RA\text{-}RNTI_{2\text{-}step} \text{ that may be used by the 2-step RACH}\} & \text{configured the } PRACH \text{ resource of the 2-step } RACH \text{ '} \\ & \text{Otherwise} \end{cases} \qquad (21)$$

$$\text{offset2} \geq \begin{cases} 14 \times 80 \times msgl\text{-}FDM_{2\text{-}step}^{NUL} = 1120 \times msgl\text{-}FDM_{2\text{-}step}^{NUL} & \text{If the } SUL \text{ carrier is not configured, or if the} \\ & SUL \text{ carrier is configured but the } SUL \text{ carrier is not} \\ & \text{configured the } PRACH \text{ resource of the 2-step } RACH \text{ '} \\ 14 \times 80 \times 8 + 14 \times 80 \times msgl\text{-}FDM_{2\text{-}step}^{NUL} = 8960 + 1120 \times msgl\text{-}FDM_{2\text{-}step}^{NUL} & \text{Otherwise} \end{cases} \qquad (22)$$

$$\text{offset2} \geq \max\{RA\text{-}RNTI_{2\text{-}step} \text{ that is actually used by the 2-step } RACH\}RA\text{-}RNTI_{2\text{-}step}; \qquad (23)$$

where, $RA\text{-}RNTI_{2\text{-}step}$ in formulae (19), (20), (21), (22) and (23) denote the fifth RNTI, and reference may be made to meanings of corresponding parameters in formulae (3), (5), (7), (9) and 10) of meanings of other parameters, which shall not be repeated herein any further.

In this embodiment, the fifth RNTI may be obtained in a method similar to the method for calculating the second RNTI in example 1) above.

For example, for the case where the maximum length of the monitoring window (msgB monitoring window) of the 2-step random access is not greater than the maximum length of the monitoring window of the 4-step random access, the fifth RNTI is determined according to an index of a first symbol where the RO of the 2-step random access is located, an index of a first slot where the RO of the 2-step random access is located in a system frame, an index of a frequency resource where the RO of the 2-step random access is located, and an index of an uplink carrier used in transmitting the preamble.

For example, the fifth RNTI may be calculated with reference to formula (11) in example 1).

For example, for the case where the maximum length of the monitoring window (msgB monitoring window) of the 2-step random access is greater than the maximum length of the monitoring window of the 4-step random access, the fifth RNTI is determined according to the index of the first symbol where the RO of the 2-step random access is located, the index of the first slot where the RO of the 2-step random access is located in the system frame, the index of the frequency resource where the RO of the 2-step random access is located, the index of the uplink carrier used in transmitting the preamble, a system frame index and a maximum monitoring window length to which the subcarrier spacing corresponds, or the second RNTI or the fifth RNTI is determined according to the index of the first symbol where the RO of the 2-step random access is located, the index of the first slot where the RO of the 2-step random access is located in a system frame, the index of the frequency resource where the RO of the 2-step random access is located, the index of the uplink carrier used in transmitting the preamble, the system frame index and the maximum monitoring window length.

In this embodiment, for example, 10240 may be evenly divided by the maximum monitoring window length in milliseconds.

For example, the fifth RNTI may be calculated with reference to formula (15) or formula (16) in example 1).

In the embodiments, after the third RNTI and/or the fourth RNTI are calculated in step 1201, steps 1202 and 1203 are executed in a manner similar to that of steps 702 and 703, which shall not be repeated herein any further.

Above description is made from the perspective that msgB is carried by one or two MAC PDUs, and the following description shall be made from a perspective of whether 2-step random access (2-step RACH) and 4-step random access (4-step RACH) use identical ROs.

For example, when 2-step random access and 4-step random access share an RO and/or the maximum monitoring window length is not greater than 10 milliseconds, the fifth RNTI is determined according to the index of the first symbol where the RO of the 2-step random access is located, the index of the first slot in a system frame, the index of the frequency resource where the RO of the 2-step random access is located, and the index of the uplink carrier used in transmitting the preamble, and the first offset is equal to zero.

The 2-step RACH may use the same RO as that used by the 4-step RACH, or may use an RO different from that used by the 4-step RACH. The same RO used by both of them may also be referred to as a shared RO, and different ROs used by both of them may also be referred to as separate ROs. When the 2-step RACH and the 4-step RACH use the same RO, the 2-step RACH and the 4-step RACH use different preambles, that is, the 2-step RACH and the 4-step RACH are distinguished by the preamble; and when the 2-step RACH and the 4-step RACH use different ROs, the 2-step RACH and the 4-step RACH may be distinguished by the ROs, hence, the 2-step RACH and the 4-step RACH may use the same preamble.

Regardless of whether the 2-step RACH uses the same RO as the 4-step RACH or the 2-step RACH uses an RO different from that used by the 4-step RACH, the above method may be applicable, that is, when fallbackRAR and successRAR are carried by one MAC PDU, msgB-RNTI is used for msgB; and when fallbackRAR and successRAR are carried by two MAC PDUs respectively, msgB-RNTI-1 and msgB-RNTI-2 are used for fallbackRAR and successRAR respectively.

In particular, on the premise that the maximum monitoring window length of msgB of the 2-step RACH is not greater than the maximum monitoring window length of Msg2 of the 4-step RACH (i.e. 10 milliseconds), when fallbackRAR and successRAR are respectively carried by two MAC PDUs and the 2-step RACH uses the same RO as the 4-step RACH, another implementation may be used. More specifically, msgB-RNTI-1=RA-RNTI$_{2\text{-}step}$ is used for fallbackRAR and msgB-RNTI-2=offset2+RA-RNTI$_{2\text{-}step}$ is used for successRAR, that is, offset1 is equal to 0. Due to the shared RO, msgB-RNTI-1 is identical to the RA-RNTI of the 4-step RACH. At this moment, although the Msg2 of the 4-step RACH and fallbackRAR of the 2-step RACH cannot be distinguished by the RNTI, the two may further be distinguished by the RAPID carried in the MAC PDU, hence, no ambiguity may be generated in the end. Due to the shared RO, it is also equivalent to that the RA-RNTI is used for fallbackRAR, and msgB-RNTI in formula (1) is used for successRAR. At this moment, the use of RNTI may be divided into the following two cases: for a case where fallbackRAR and successRAR are respectively carried by two MAC PDUs and the 2-step RACH uses the same RO as the 4-step RACH, only one new RNTI (msgB-RNTI) is used; and for a case where fallbackRAR and successRAR are respectively carried by two MAC PDUs and the 2-step RACH uses an RO different from that used by the 4-step RACH, two new RNTIs (i.e. msgB-RNTI-1 and msgB-RNTI-2) are used. When offset1 and offset2 may be configured by the network device, for the case where fallbackRAR and successRAR are respectively carried by two MAC PDUs and the 2-step RACH uses the same RO as the 4-step RACH, the network device may configure that offset1 is equal to 0. Use of the RNTI is summarized in Table 1.

TABLE 1

|  | The 2-step RACH and the 4-step RACH use different ROs | The 2-step RACH and the 4-step RACH use the same RO |
|---|---|---|
| fallbackRAR and successRAR are carried by one MAC PDU | msgB-RNTI is used for msgB | msgB-RNTI is used for msgB |
| fallbackRAR and successRAR are carried by two MAC PDUs | msgB-RNTI-1 is used for fallbackRAR, and msgB-RNTI-2 is used for successRAR | msgB-RNTI-1 is used for fallbackRAR, and msgB-RNTI-2 is used for successRAR, or RA-RNTI is used for fallbackRAR, and msgB-RNTI is used for successRAR |

In addition, for the 2-step random access (the 2-step RACH), after RO and PO resources are configured, it may happen that a slot or symbol configured to transmit a preamble and/or where PUSCHs are located are unavailable; for example, if a set of symbols of a slot are downlink or flexible symbols, or a user needs to cancel transmission of a preamble or needs to cancel transmission of a PUSCH on a set of symbols of a slot, it is deemed at this moment that the slot or symbols is/are unavailable. Reference may be made to sub-section 11.1 of TS 38.213 V15.6.0 for strict conditions for a user to cancel transmission of a preamble and/or transmission of PUSCH, which shall not be repeated herein any further. When a slot or symbol where a PUSCH is located is unavailable, but a slot or symbol where a preamble associated therewith is available, the user may still use the slot or symbol where the preamble is located to transmit the preamble, that is, falling back to being used as a traditional 4-step RACH. For the 4-step RACH, the monitoring window will start after the slot or symbol where the preamble is located. However, when falling back to the 4-step RACH due to unavailability of the PUSCH, although only the preamble is able to be transmitted, the monitoring window is unable to start after the slot or symbol where the preamble is located, otherwise, it will cause RNTI confusion.

Figure 13:
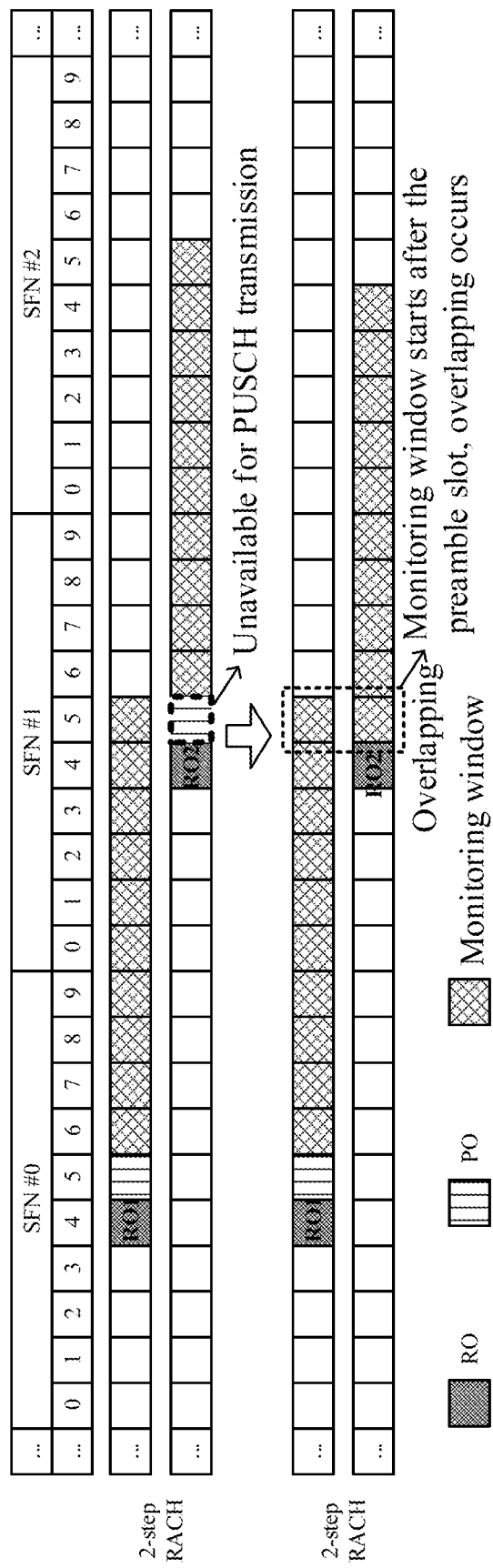
FIG. 13 is a schematic diagram of still another example of the random access procedure of Embodiment 1 of this disclosure.

FIG. 13 is a schematic diagram of still another example of the random access procedure of Embodiment 1 of this disclosure. In the time domain, according to Table 6.3.3.2-3 of 3GPP TS 38.211 V15.6.0, the PRACH configuration index of the 2-step RACH is configured to be as 12. According to the above PRACH configuration, the RO of the 2-step RACH is located in a slot with an index 4 in each system frame. In the frequency domain, there is no restriction on the frequency resource configuration of the 2-step RACH. For the sake of simplicity, FIG. 13 shows 2-step RACHs with identical frequency resource indices. It is assumed in FIG. 13 that a time length of the monitoring window is 10 milliseconds, and the maximum monitoring window length is also 10 milliseconds. Although slot 5 of SFN#1 in FIG. 13 is configured as a PO, according to the condition of sub-section 11.1 of TS 38.213 V15.6.0, this slot is unavailable for PUSCH transmission, but RO2 may still be used for PUSCH transmission. According to the existing 4-step random access (the 4-step RACH) method, the monitoring window to which RO2 corresponds starts from slot 5, but the monitoring window will overlap with the monitoring window of RO1, and as RO1 and RO2 correspond to the same RNTI, RNTI confusion will occur in the overlapped parts of the monitoring windows.

In this embodiment, when the slot or the symbol where the uplink shared channel is located is unavailable and the slot or the symbol where the preamble associated with the uplink shared channel is available, 2-step random access allows uses of the slot or the symbol where the preamble associated with the uplink shared channel is located to transmit the preamble, and the monitoring window is located after the slot or the symbol where the uplink shared channel is located. For example, the monitoring window is after a last symbol of the PO and starts from a first symbol of an earliest CORESET (control resource set) used for receiving a PDCCH scheduling msgB. Still taking FIG. 13 as an example, let the monitoring window of RO2 start from slot 6, that is, it still follows the starting position of the corresponding monitoring window when the PUSCH exists. At this moment, as the monitoring windows overlap no longer, RNTI confusion may be avoided.

Or, when the slot or the symbol where the uplink shared channel is located is unavailable and the slot or the symbol where the preamble associated with the uplink shared channel is located is available, 2-step random access does not allow the use of the slot or the symbol where the preamble associated with the uplink shared channel is located to transmit the preamble. By adding such a restriction, the above problem of RNTI confusion may also be avoided.

It can be seen from the above embodiments that by using an RNTI different from the RA-RNTI actually used in the 4-step random access to perform CRC scrambling on the DCI scheduling msgB, confusion of RNTIs in the 2-step random access may be avoided, that is, it may be not only avoided that a user equipment of the 2-step random access mistakenly deems MsgB or Msg2 of an RO not for itself as MsgB of an RO of itself, but also avoided that a user equipment of the 4-step random access mistakenly deems MsgB of an RO not for itself as Msg2 of an RO of itself.

EMBODIMENT 2

The embodiments of this disclosure provide a method for receiving a random access response in the 2-step random access, applicable to a user equipment side.

Figure 14:
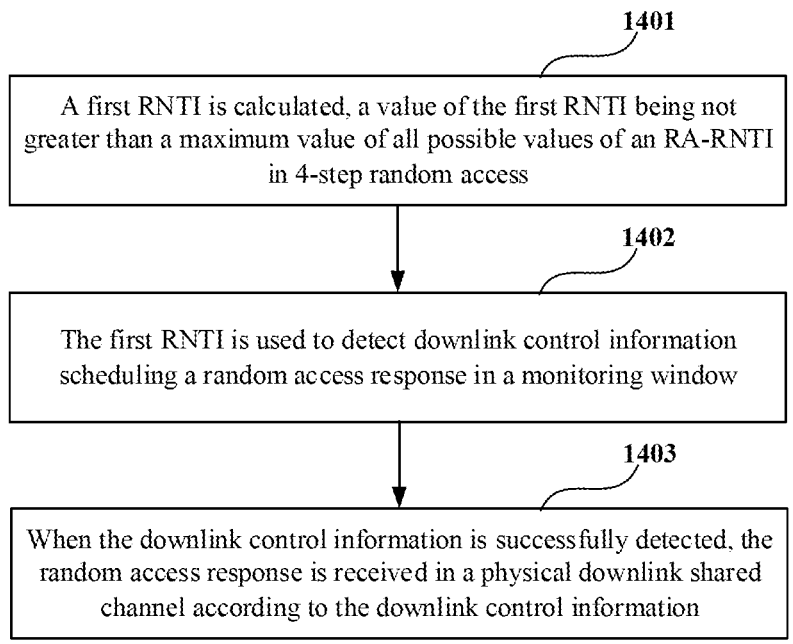
FIG. 14 is a schematic diagram of the method for receiving a random access response in the 2-step random access of Embodiment 2 of this disclosure.

FIG. 14 is a schematic diagram of the method for receiving a random access response in the 2-step random access of Embodiment 2 of this disclosure. As shown in FIG. 14, the method includes:

Step 1401: a first RNTI is calculated, a value of the first RNTI being not greater than a maximum value of all possible values of an RA-RNTI in the 4-step random access;

Step 1402: the first RNTI is used to detect downlink control information scheduling a random access response in a monitoring window; and Step 1403: when the downlink control information is successfully detected, the random access response is received in a physical downlink shared channel according to the downlink control information.

Corresponding to example 1) in Embodiment 1, that is, the case where msgB is carried by one MAC PDU, in step 1401, the first RNTI may be calculated according to the second RNTI and the offset.

For example, the offset is greater than or equal to a value determined according to the configuration information of the second carrier, the second PRACH configuration information of four-step random access on the second carrier and the second PRACH configuration information of four-step random access on the first carrier, and a sum of an msg1-FDM parameter in PRACH resource configuration of four-step random access of the carrier and an msg1-FDM parameter in the PRACH resource configuration of two-step random access of the same carrier is not greater than 8. For example, the offset is obtained through calculating according to formula (24) below:

$$offset \geq \begin{cases} 14 \times 80 \times msg1\text{-}FDM^{NUL}_{4\text{-}step} = 1120 \times msg1\text{-}FDM^{NUL}_{4\text{-}step} & \text{if } ul\_carrier\_id_{2\text{-}step} = 0 \\ 14 \times 80 \times 8 + 14 \times 80 \times msg1\text{-}FDM^{NUL}_{4\text{-}step} = 8960 + 2230 \times msg1\text{-}FDM^{NUL}_{4\text{-}step} & \text{if } ul\_carrier\_id_{2\text{-}step} = 1 \end{cases} ; \quad (24)$$

where, $msg1\text{-}FDM^{NUL}_{4\text{-}step}$ denotes the msg1-FDM parameter in the PRACH resource configuration of the 4-step RACH of the NUL carrier, $msg1\text{-}FDM^{SUL}_{4\text{-}step}$ denotes the msg1-FDM parameter in the PRACH resource configuration of the 4-step RACH of the SUL carrier, a value of msg1-FDM being one of 1, 2, 4 and 8, and being used to indicate the number of ROs multiplexed in FDM mode in the frequency domain.

The parameters in formula (24) are restricted as follows: $msg1\text{-}FDM^{NUL}_{4\text{-}step} + msg1\text{-}FDM^{NUL}_{2\text{-}step} \leq 8$ and/or $msg1\text{-}FDM^{SUL}_{4\text{-}step} + msg1\text{-}FDM^{SUL}_{2\text{-}step} \leq 8$. With this restriction, a value of msgB-RNTI of the 2-step RACH will not be greater than a maximum value of an available RA-RNTI of the 4-step RACH, that is, msgB-RNTI and RA-RNTI share the same section of value range, the value range being a value range of the available RA-RNTI of the 4-step RACH. In this way, although supporting the 2-step RACH is added on the basis of the 4-step RACH, the RNTIs (msgB-RNTI and RA-RNTI) used for random access responses of the 2-step RACH the 4-step RACH still fall within the value range of RA-RNTI of 4-step RACH, that is, the value range of the RNTI used for the random access response is not extended.

In this embodiment, reference may be made to the description in Embodiment 1 for a method for calculating the second RNTI. For example, the second RNTI is calculated according to formula (11) in Embodiment 1.

Substituting formula (24) and formula (11) into formula (1), formula (25) below is obtained:

$$msgB\text{-}RNTI \geq \begin{cases} 1 + s\_id_{2\text{-}step} + 14 \times t\_id_{2\text{-}step} + 14 \times 80 \times (f\_id_{2\text{-}step} + msg1 - FDM^{NUL}_{4\text{-}step}) & \text{if } ul\_carrier\_id_{2\text{-}step} = 0 \\ 1 + s\_id_{2\text{-}step} + 14 \times t\_id_{2\text{-}step} + 14 \times 80 \times (f\_id_{2\text{-}step} + msg1 - FDM^{SUL}_{4\text{-}step}) & \text{if } ul\_carrier\_id_{2\text{-}step} = 1 \end{cases} ; \quad (25)$$

where, reference may be made to formulae (1), (11) and (24) for specific meanings of the parameters, which shall not be repeated herein any further.

Corresponding to example 2) in Embodiment 1, that is, the case where msgB is carried by two MAC PDUs, the first RNTI includes the third RNTI and the fourth RNTI, and the values of the third RNTI and the fourth RNTI are not greater than the maximum value of all possible values of the RA-RNTI of the 4-step random access, and in step 1401, the third RNTI is calculated according to the fifth RNTI and the first offset offset1, and/or the fourth RNTI is calculated according to the fifth RNTI, the first offset offset1 and the second offset offset2.

For example, the first offset offset1 is greater than or equal to the value determined according to the configuration information of the second carrier, the second PRACH configuration information of the 4-step random access on the second carrier and the second PRACH configuration information of the 4-step random access on the first carrier, the second offset offset2 is greater than or equal to the value determined according to the PRACH configuration information of the second carrier, the second PRACH configuration information of the 4-step random access on the second carrier and the second PRACH configuration information of the 2-step random access on the first carrier, and a sum of the msg1-FDM parameter in the PRACH resource configuration of the 4-step random access of the carrier and twice of the msg1-FDM parameter in the PRACH resource configuration of the 4-step random access on the same carrier is not greater than 8.

For example, the first offset offset1 may be obtained through calculation by using formula (24), and the second offset offset2 may be obtained through calculation according to formula (26) below:

$$offset2 \geq \begin{cases} 14 \times 80 \times msg1\text{-}FDM^{NUL}_{2\text{-}step} = 1120 \times msg1\text{-}FDM^{NUL}_{2\text{-}step} & \text{if } ul\_carrier\_id_{2\text{-}step} = 0 \\ 14 \times 80 \times msg1\text{-}FDM^{SUL}_{2\text{-}step} = 1120 \times msg1\text{-}FDM^{SUL}_{2\text{-}step} & \text{if } ul\_carrier\_id_{2\text{-}step} = 1 \end{cases} \quad (26)$$

where, $msg1\text{-}FDM^{NUL}_{2\text{-}step}$ denotes the msg1-FDM parameter in the PRACH resource configuration of the 2-step RACH of the NUL carrier, and $msg1\text{-}FDM^{SUL}_{2\text{-}step}$ denotes the msg1-FDM parameter in the PRACH resource configuration of the 2-step RACH of the SUL carrier.

The parameters in formula (26) are restricted as follows: $msg1\text{-}FDM^{NUL}_{2\text{-}step} + 2 \times msg1\text{-}FDM^{NUL}_{2\text{-}step} \leq 8$ and/or $msg1\text{-}FDM^{SUL}_{4\text{-}step} 2 \times msg1\text{-}FDM^{SUL}_{2\text{-}step} \leq 8$. With this restriction, the value of msgB-RNTI of the 2-step RACH will not be greater than the maximum value of RA-RNTI available for the 4-step RACH, that is, msgB-RNTI and RA-RNTI share the same section of a value range, and this value range is the value range of the available RA-RNTI for the 4-step RACH. In this way, although supporting the 2-step RACH is added on the basis of the 4-step RACH, the RNTIs (msgB-RNTI and RA-RNTI) used for random access responses of the 2-step RACH the 4-step RACH still fall within the value range of RA-RNTI of 4-step RACH, that is, the value range of the RNTI used for the random access response is not extended.

It can be seen from the above embodiment that by limiting the msg1-FDM parameter, the value of the first RNIT is not greater than the maximum value of all possible values of the RA-RNTI of the 4-step random access, which may also avoid RNTI confusion in the 2-step random access.

EMBODIMENT 3

The embodiments of this disclosure provides a method for transmitting a random access response in the 2-step random access, applicable to a network device side. This method corresponds to the method for receiving a random access response in the 2-step random access at the user equipment side described in Embodiment 1, and reference may be made to Embodiment 1 for identical or related contents.

Figure 15:
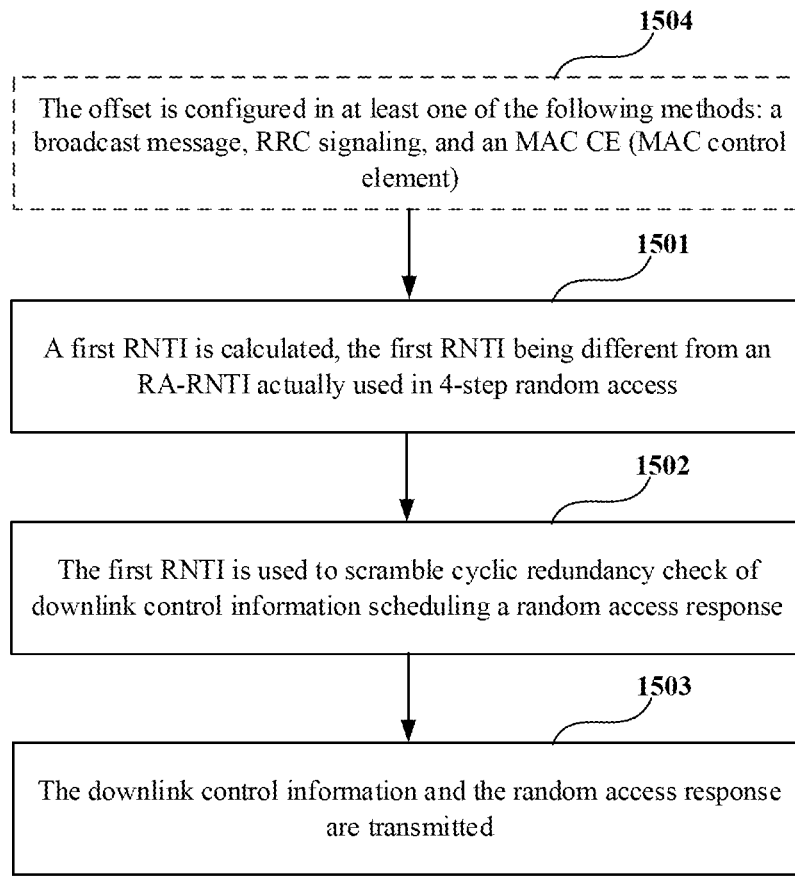
FIG. 15 is a schematic diagram of the method for transmitting a random access response in the 2-step random access of Embodiment 3 of this disclosure.

Corresponding to example 1) in Embodiment 1, msgB is carried by one MAC PDU. FIG. 15 is a schematic diagram of the method for transmitting a random access response in the 2-step random access of Embodiment 3 of this disclosure. As shown in FIG. 15, the method includes:

Step 1501: a first RNTI is calculated, the first RNTI being different from an RA-RNTI actually used in the 4-step random access;

Step 1502: the first RNTI is used to scramble cyclic redundancy check of downlink control information scheduling a random access response; and Step 1503: the downlink control information and the random access response are transmitted. For example, in step 1501, the first RNTI is calculated according to the second RNTI and the offset.

In this embodiment, a specific method for calculating the second RNTI may be identical to the method described in Embodiment 1, which shall not be repeated herein any further.

In step 1502, the calculated first RNTI is used to scramble the CRC of the DCI scheduling the random access response, and reference may be made to related relevant art for a specific method for scrambling, which shall not be described herein in detail.

In step 1503, for example, the DCI with scrambled CRC is transmitted via the PDCCH, and the random access response is transmitted via the PDSCH.

In this embodiment, the offset may be configured by the network device. For example, as shown in FIG. 15, before step 1501, the method may further include:

Step 1504: the offset is configured in at least one of the following methods: a broadcast message, RRC signaling, and an MAC CE (MAC control element).

For example, the broadcast message may be system information SIB1 or MIB.

In this embodiment, a specific value of the offset is not limited.

For example, a method for determining the offset may be identical to the method described in Embodiment 1, which shall not be repeated herein any further.

Corresponds to example 2) in Embodiment 1, msgB is carried by two MAC PDUs.

Figure 16:
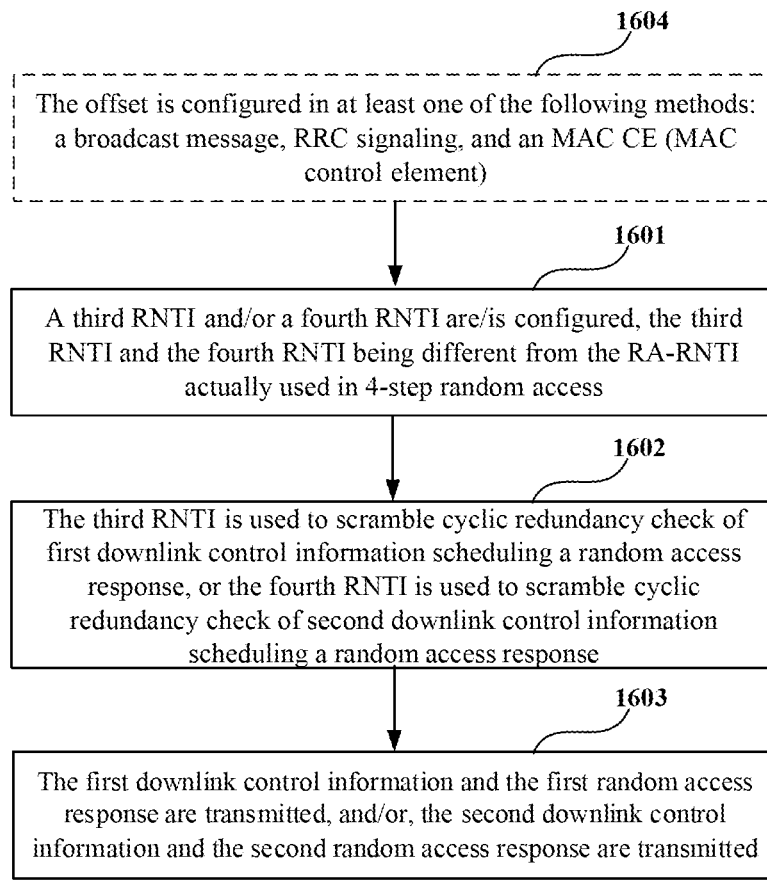
FIG. 16 is another schematic diagram of the method for transmitting a random access response in the 2-step random access of Embodiment 3 of this disclosure.

FIG. 16 is another schematic diagram of the method for transmitting a random access response in the 2-step random access of Embodiment 3 of this disclosure. As shown in FIG. 16, the method includes:

Step 1601: a third RNTI and/or a fourth RNTI are/is configured, the third RNTI and the fourth RNTI being different from the RA-RNTI actually used in the 4-step random access;

Step 1602: the third RNTI is used to scramble cyclic redundancy check of first downlink control information scheduling a random access response, or the fourth RNTI is used to scramble cyclic redundancy check of second downlink control information scheduling a random access response; and Step 1603: the first downlink control information and the first random access response are transmitted, and/or, the second downlink control information and the second random access response are transmitted.

In step 1601, for example, the third RNTI is calculated according to the fifth RNTI and the first offset, and/or the fourth RNTI is calculated according to the fifth RNTI, the first offset and the second offset.

In this embodiment, methods for calculating the third RNTI and the fourth RNTI and a method for calculating the fifth RNTI are identical to those described in Embodiment 1, which shall not be repeated herein any further.

In this embodiment, the first offset and/or the second offset may be configured by the network device. For example, as shown in FIG. 16, before step 1601, the method may further include:

Step 1604: the offset is configured in at least one of the following methods: a broadcast message, RRC signaling, and an MAC CE (MAC control element).

For example, the broadcast message may be system information SIB1 or MIB.

In this embodiment, specific values of the first offset and the second offset are not limited.

For example, methods for determining the first offset and the second offset may be identical to the method described in Embodiment 1, which shall not be repeated herein any further.

It can be seen from the above embodiment that by using an RNTI different from the RA-RNTI actually used in the 4-step random access to perform CRC scrambling on the DCI scheduling msgB, confusion of RNTIs in the 2-step random access may be avoided, that is, it may be not only avoided that a user equipment of the 2-step random access mistakenly deems MsgB or Msg2 of an RO not for itself as MsgB of an RO of itself, but also avoided that a user equipment of the 4-step random access mistakenly deems MsgB of an RO not for itself as Msg2 of an RO of itself.

EMBODIMENT 4

The embodiments of this disclosure provide a method for transmitting a random access response in the 2-step random access, applicable to a network device side. This method corresponds to the method for receiving a random access response in the 2-step random access at the user equipment side described in Embodiment 2, and reference may be made to Embodiment 2 for identical or related contents.

Figure 17:
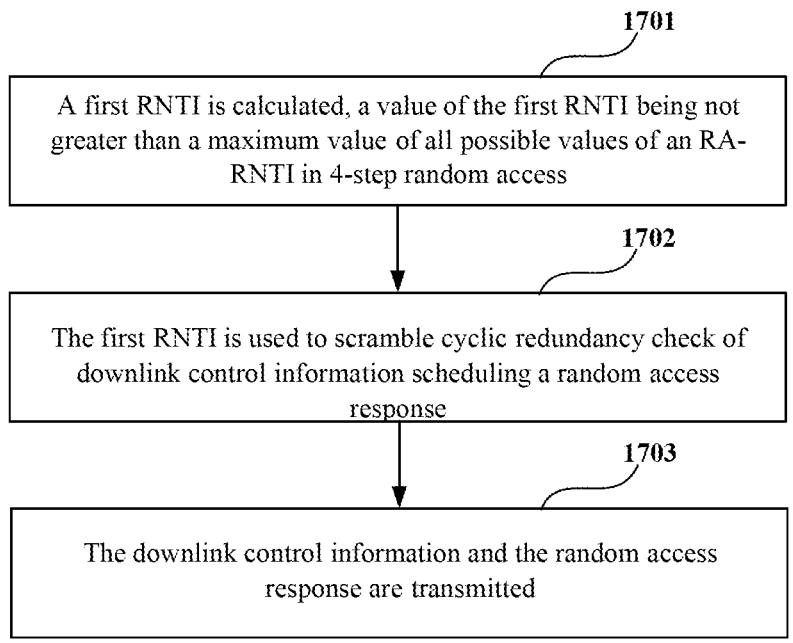
FIG. 17 is a schematic diagram of the method for transmitting a random access response in the 2-step random access of Embodiment 4 of this disclosure.

FIG. 17 is a schematic diagram of the method for transmitting a random access response in the 2-step random access of Embodiment 4 of this disclosure. As shown in FIG. 17, the method includes:

Step 1701: a first RNTI is calculated, a value of the first RNTI being not greater than a maximum value of all possible values of an RA-RNTI in the 4-step random access;

Step 1702: the first RNTI is used to scramble cyclic redundancy check of downlink control information scheduling a random access response; and Step 1703: the downlink control information and the random access response are transmitted.

In step 1701, the method for calculating the first RNTI may be identical to that described in Embodiment 2, which shall not be repeated herein any further.

In step 1702 and step 1703, reference may be made to the implementations of related steps in Embodiment 3 for specific implementation methods, which shall not be repeated herein any further.

It can be seen from the above embodiment that by limiting the msg1-FDM parameter, the value of the first RNIT is not greater than the maximum value of all possible values of the RA-RNTI of the 4-step random access, which may also avoid RNTI confusion in the 2-step random access.

EMBODIMENT 5

The embodiment of this disclosure provides a method for transmitting and receiving random access responses in the 2-step random access, applicable to a network device side and a user equipment side. This method corresponds to the method for receiving a random access response in the 2-step random access applicable to the user equipment side described in Embodiment 1 and the method for transmitting a random access response in the 2-step random access applicable to the network device side described in Embodiment 3, and reference may be made to Embodiment 1 and Embodiment 3 for identical or related contents.

Corresponding to example 1) in Embodiment 1, msgB is carried by one MAC PDU.

Figure 18:
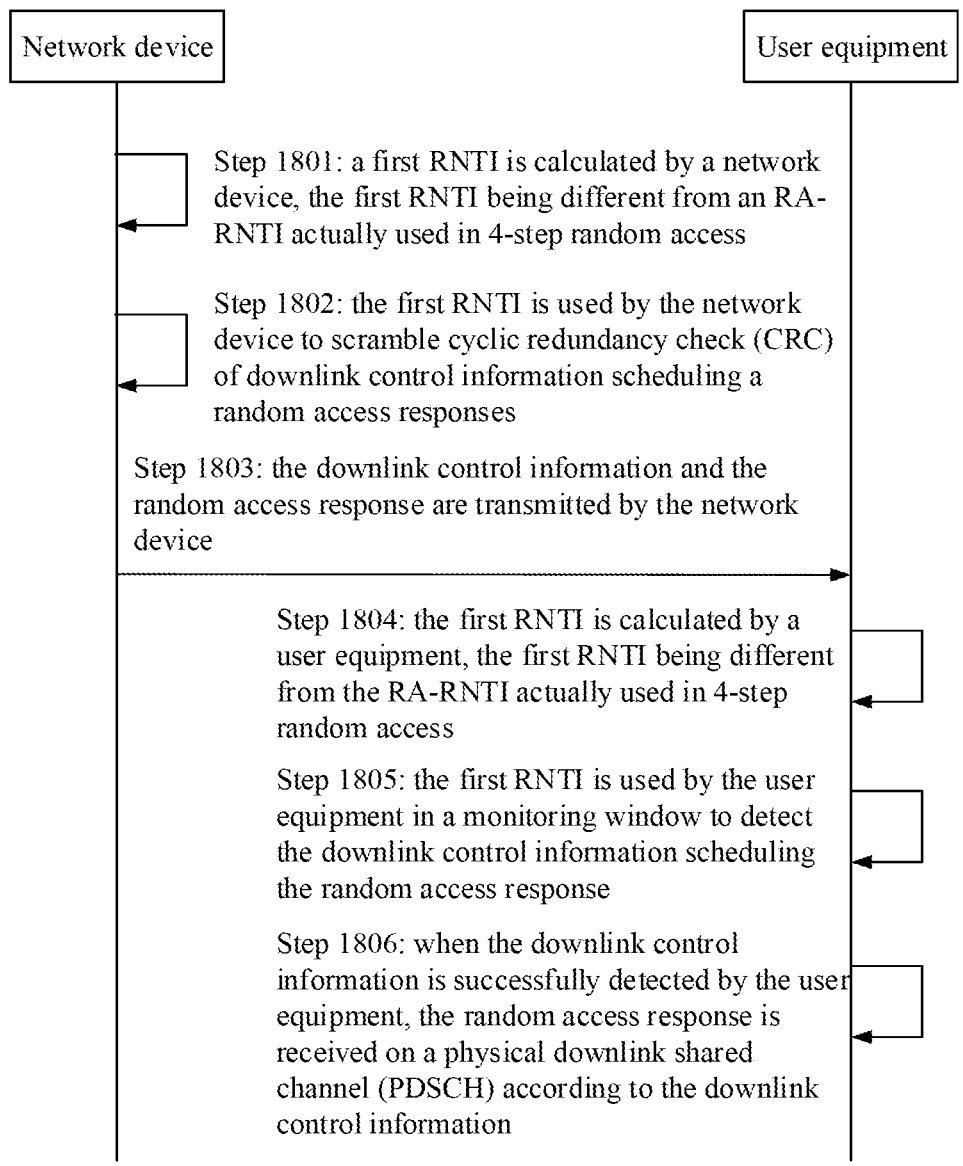
FIG. 18 is a schematic diagram of the method for transmitting and receiving a random access response in the 2-step random access of Embodiment 5 of this disclosure.

FIG. 18 is a schematic diagram of the method for transmitting and receiving a random access response in the 2-step random access of Embodiment 5 of this disclosure. As shown in FIG. 18, the method includes:

Step 1801: a first RNTI is calculated by a network device, the first RNTI being different from an RA-RNTI actually used in the 4-step random access;

Step 1802: the first RNTI is used by the network device to scramble cyclic redundancy check (CRC) of downlink control information scheduling a random access responses;

Step 1803: the downlink control information and the random access response are transmitted by the network device;

Step 1804: the first RNTI is calculated by a user equipment, the first RNTI being different from the RA-RNTI actually used in the 4-step random access;

Step 1805: the first RNTI is used by the user equipment in a monitoring window to detect the downlink control information scheduling the random access response; and Step 1806: when the downlink control information is successfully detected by the user equipment, the random access response is received on a physical downlink shared channel (PDSCH) according to the downlink control information.

Corresponding to example 2) in Embodiment 1, msgB is carried by two MAC PDUs.

Figure 19:
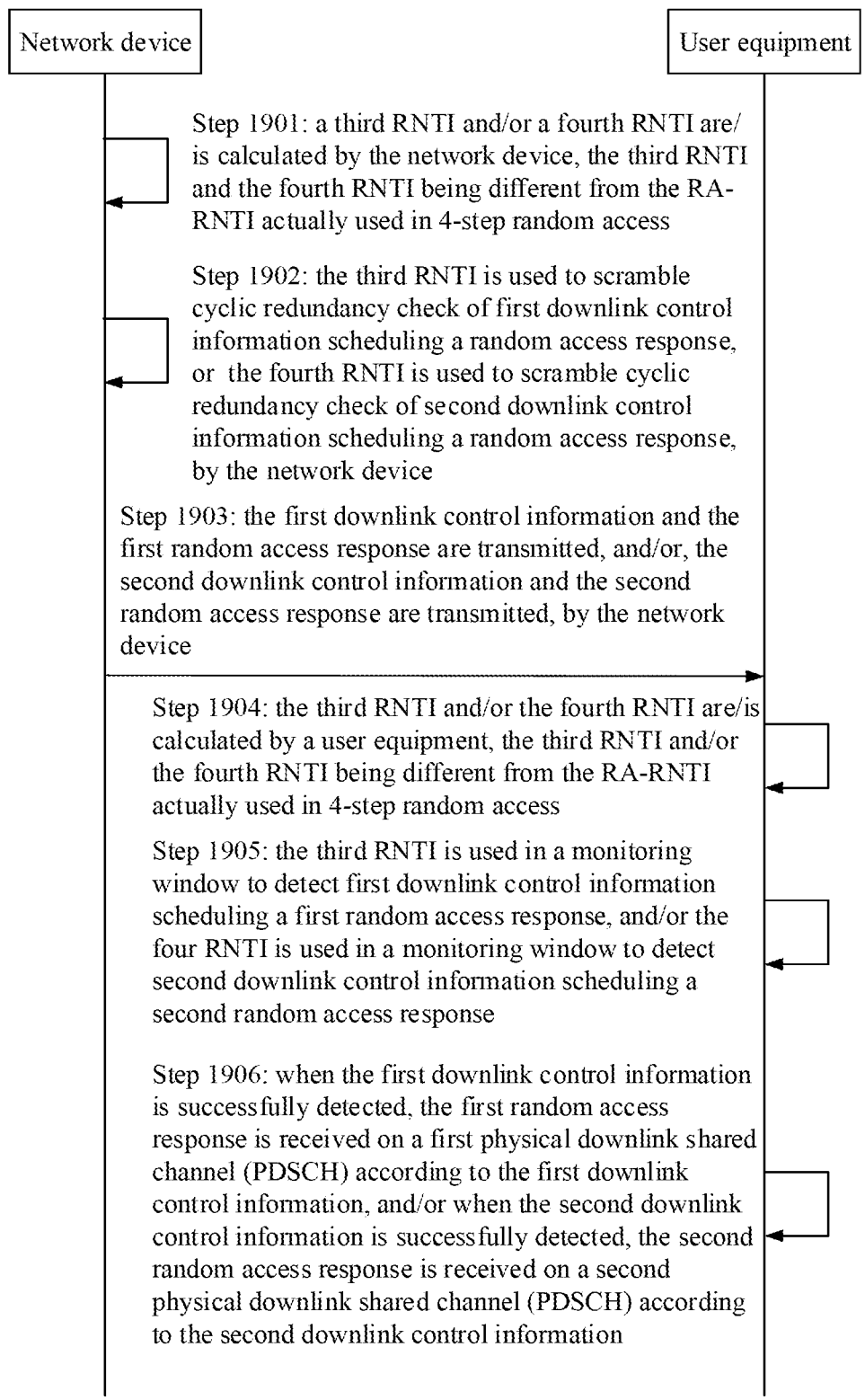
FIG. 19 is another schematic diagram of the method for transmitting and receiving a random access response in the 2-step random access of Embodiment 5 of this disclosure.

FIG. 19 is another schematic diagram of the method for transmitting and receiving a random access response in the 2-step random access of Embodiment 5 of this disclosure. As shown in FIG. 19, the method includes:

Step 1901: a third RNTI and/or a fourth RNTI are/is calculated by the network device, the third RNTI and the fourth RNTI being different from the RA-RNTI actually used in the 4-step random access;

Step 1902: the third RNTI is used to scramble cyclic redundancy check of first downlink control information scheduling a random access response, or the fourth RNTI is used to scramble cyclic redundancy check of second downlink control information scheduling a random access response, by the network device;

Step 1903: the first downlink control information and the first random access response are transmitted, and/or, the second downlink control information and the second random access response are transmitted, by the network device;

Step 1904: the third RNTI and/or the fourth RNTI are/is calculated by a user equipment, the third RNTI and/or the fourth RNTI being different from the RA-RNTI actually used in the 4-step random access;

Step 1905: the third RNTI is used in a monitoring window to detect first downlink control information scheduling a first random access response, and/or the four RNTI is used in a monitoring window to detect second downlink control information scheduling a second random access response; and Step 1906: when the first downlink control information is successfully detected, the first random access response is received on a first physical downlink shared channel (PDSCH) according to the first downlink control information, and/or when the second downlink control information is successfully detected, the second random access response is received on a second physical downlink shared channel (PDSCH) according to the second downlink control information.

In this embodiment, reference may be made to Embodiment 1 and Embodiment 3 for implementations of the steps, which shall not be repeated herein any further.

It can be seen from the above embodiment that by using an RNTI different from the RA-RNTI actually used in the 4-step random access to perform CRC scrambling on the DCI scheduling msgB, confusion of RNTIs in the 2-step random access may be avoided, that is, it may be not only avoided that a user equipment of the 2-step random access mistakenly deems MsgB or Msg2 of an RO not for itself as MsgB of an RO of itself, but also avoided that a user equipment of the 4-step random access mistakenly deems MsgB of an RO not for itself as Msg2 of an RO of itself.

EMBODIMENT 6

The embodiment of this disclosure provides a method for transmitting and receiving random access responses in the 2-step random access, applicable to a network device side and a user equipment side. This method corresponds to the method for receiving a random access response in the 2-step random access applicable to the user equipment side described in Embodiment 2 and the method for transmitting a random access response in the 2-step random access applicable to the network device side described in Embodiment 4, and reference may be made to Embodiment 1 and Embodiment 2 for identical or related contents.

Figure 20:
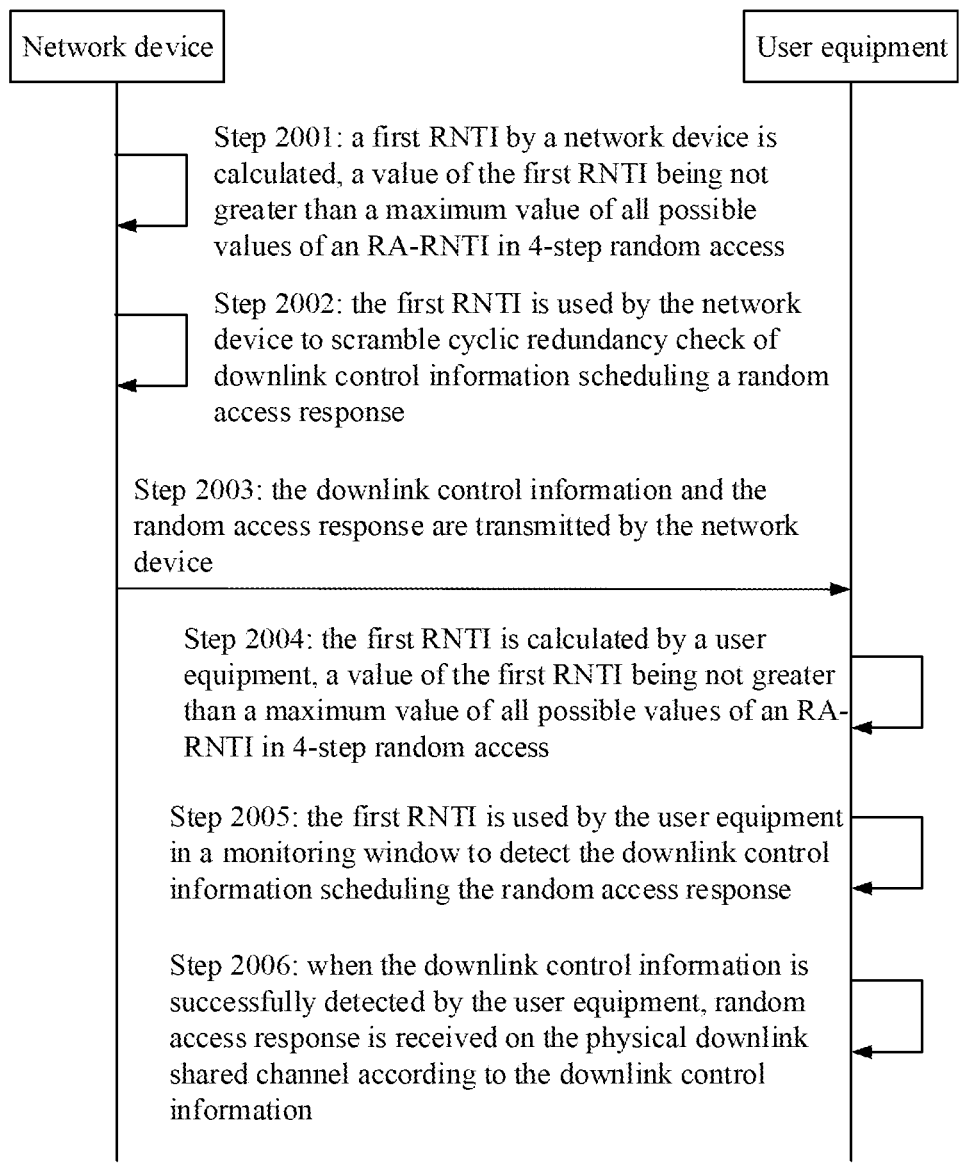
FIG. 20 is a schematic diagram of the method for transmitting and receiving a random access response in the 2-step random access of Embodiment 6 of this disclosure.

FIG. 20 is a schematic diagram of the method for transmitting and receiving a random access response in the 2-step random access of Embodiment 6 of this disclosure. As shown in FIG. 20, the method includes:

Step 2001: a first RNTI by a network device is calculated, a value of the first RNTI being not greater than a maximum value of all possible values of an RA-RNTI in the 4-step random access;

Step 2002: the first RNTI is used by the network device to scramble cyclic redundancy check of downlink control information scheduling a random access response;

Step 2003: the downlink control information and the random access response are transmitted by the network device;

Step 2004: the first RNTI is calculated by a user equipment, a value of the first RNTI being not greater than a maximum value of all possible values of an RA-RNTI in the 4-step random access;

Step 2005: the first RNTI is used by the user equipment in a monitoring window to detect the downlink control information scheduling the random access response; and Step 2006: when the downlink control information is successfully detected by the user equipment, random access response is received on the physical downlink shared channel according to the downlink control information.

In this embodiment, reference may be made to Embodiment 2 and Embodiment 4 for implementations of the operations, which shall not be repeated herein any further.

It can be seen from the above embodiment that by limiting the msg1-FDM parameter, the value of the first RNIT is not greater than the maximum value of all possible values of the RA-RNTI of the 4-step random access, which may also avoid RNTI confusion in the 2-step random access.

EMBODIMENT 7

The embodiments of this disclosure provide an apparatus for receiving a random access response in the 2-step random access, configured at a user equipment side. As a principle of the apparatus for solving problems is similar to that of the method of Embodiment 1, reference may be made to the implementations of the method of Embodiment 1 for implementations of this apparatus, with identical parts being not going to be described herein any further.

Figure 21:
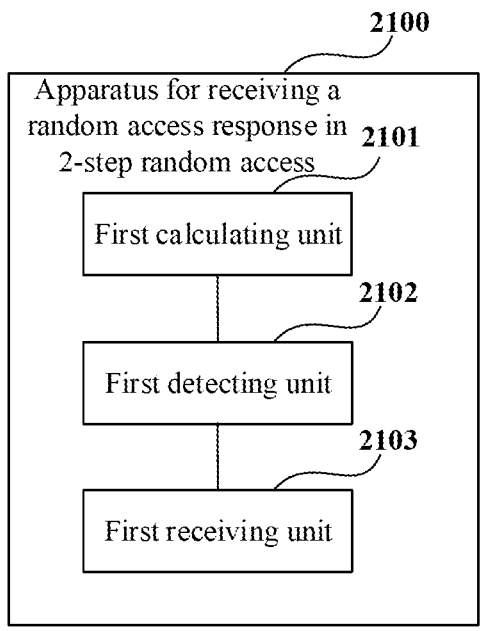
FIG. 21 is a schematic diagram of the apparatus for receiving a random access response in the 2-step random access of Embodiment 7 of this disclosure.

FIG. 21 is a schematic diagram of the apparatus for receiving a random access response in the 2-step random access of Embodiment 7 of this disclosure. As shown in FIG. 21, an apparatus 2100 includes:

a first calculating unit 2101 configured to calculate a first RNTI, the first RNTI being different from an RA-RNTI actually used in the 4-step random access;

a first detecting unit 2102 configured to use the first RNTI to detect downlink control information (DCI) scheduling a random access response in a monitoring window; and a first receiving unit 2103 configured to, when the downlink control information is successfully detected, receive the random access response in a physical downlink shared channel (PDSCH) according to the downlink control information.

For example, the first calculating unit 2101 calculates the first RNTI according to a second RNTI and an offset.

For example, corresponding to example 2) in Embodiment 1, the first RNTI includes a third RNTI and/or a fourth RNTI.

Figure 22:
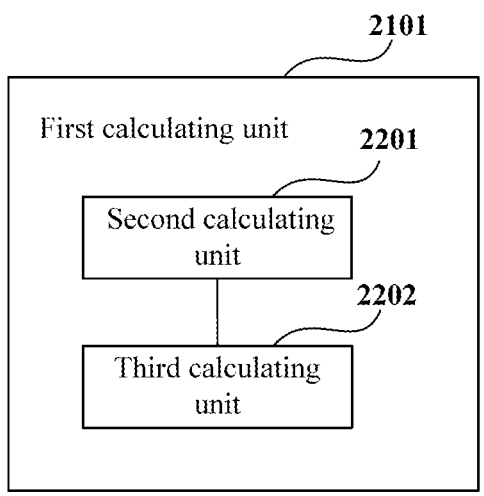
FIG. 22 is a schematic diagram of the first calculating unit 2101 of Embodiment 7 of this disclosure.
Figure 23:
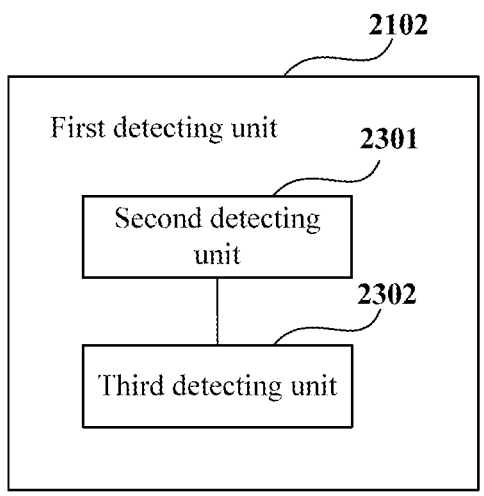
FIG. 23 is a schematic diagram of the first detecting unit 2102 of Embodiment 7 of this disclosure.

FIG. 22 is a schematic diagram of the first calculating unit 2101 of Embodiment 7 of this disclosure. As shown in FIG. 22, the first calculating unit 2101 includes:

a second calculating unit 2201 configured to calculate the third RNTI according to a fifth RNTI and a first offset; and/or a third calculating unit 2202 configured to calculate the fourth RNTI according to the fifth RNTI, the first offset and a second offset;

FIG. 23 is a schematic diagram of the first detecting unit 2102 of Embodiment 7 of this disclosure. As shown in FIG. 23, the first detecting unit 2102 includes:

a second detecting unit 2301 configured to use the third RNTI to detect first downlink control information scheduling a first random access response in a monitoring window; and/or a third detecting unit 2302 configured to use the fourth RNTI to detect second downlink control information scheduling a second random access response in a monitoring window.

In this embodiment, reference may be made to the description of corresponding steps in Embodiment 1 for implementations of functions of the above units, which shall not be repeated herein any further.

It can be seen from the above embodiment that by using an RNTI different from the RA-RNTI actually used in the 4-step random access to perform CRC scrambling on the DCI scheduling msgB, confusion of RNTIs in the 2-step random access may be avoided, that is, it may be not only avoided that a user equipment of the 2-step random access mistakenly deems MsgB or Msg2 of an RO not for itself as MsgB of an RO of itself, but also avoided that a user equipment of the 4-step random access mistakenly deems MsgB of an RO not for itself as Msg2 of an RO of itself.

EMBODIMENT 8

The embodiments of this disclosure provide an apparatus for receiving a random access response in the 2-step random access, configured at a user equipment side. As a principle of the apparatus for solving problems is similar to that of the method of Embodiment 2, reference may be made to the implementations of the method of Embodiment 2 for implementations of this apparatus, with identical parts being not going to be described herein any further.

Figure 24:
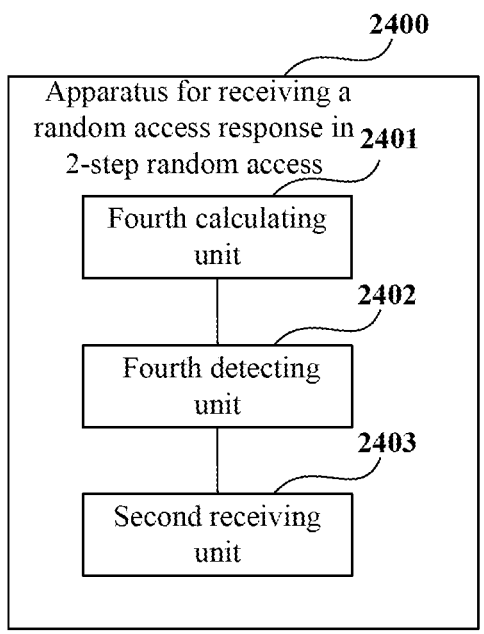
FIG. 24 is a schematic diagram of the apparatus for receiving a random access response in the 2-step random access of Embodiment 8 of this disclosure.

FIG. 24 is a schematic diagram of the apparatus for receiving a random access response in the 2-step random access of Embodiment 8 of this disclosure. As shown in FIG. 24, an apparatus 2400 includes:
- a fourth calculating unit 2401 configured to calculate a first RNTI, a value of the first RNTI being not greater than a maximum value of all possible values of an RA-RNTI in the 4-step random access;
- a fourth detecting unit 2402 configured to use the first RNTI to detect downlink control information scheduling a random access response in a monitoring window; and
- a second receiving unit 2403 configured to, when the downlink control information is successfully detected, receive the random access response in a physical downlink shared channel according to the downlink control information.

For example, the fourth calculating unit 2401 calculates the first RNTI according to a second RNTI and an offset.

Figure 25:
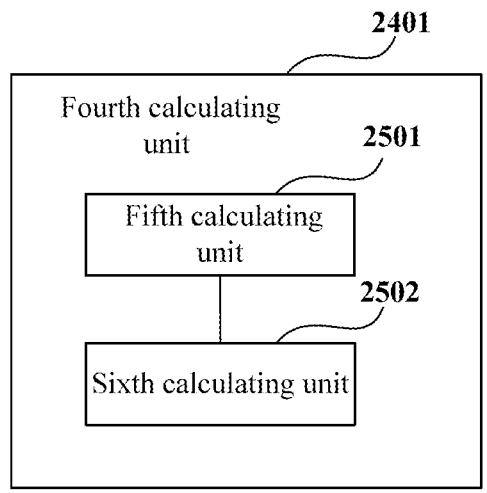
FIG. 25 is a schematic diagram of the fourth calculating unit 2401 of Embodiment 8 of this disclosure.

For example, corresponding to example 2) in Embodiment 1, the first RNTI includes a third RNTI and/or a fourth RNTI, FIG. 25 is a schematic diagram of the fourth calculating unit 2401 of Embodiment 8 of this disclosure. As shown in FIG. 25, the fourth calculating unit 2401 includes:
- a fifth calculating unit 2501 configured to calculate the third RNTI according to a fifth RNTI and a first offset; and/or
- a sixth calculating unit 2502 configured to calculate the fourth RNTI according to the fifth RNTI, the first offset and a second offset.

In this embodiment, reference may be made to the description of corresponding steps in Embodiment 1 for implementations of functions of the above units, which shall not be repeated herein any further.

It can be seen from the above embodiment that by limiting the msg1-FDM parameter, the value of the first RNIT is not greater than the maximum value of all possible values of the RA-RNTI of the 4-step random access, which may also avoid RNTI confusion in the 2-step random access.

EMBODIMENT 9

The embodiments of this disclosure provide an apparatus for transmitting a random access response in the 2-step random access, configured at a network device side. As a principle of the apparatus for solving problems is similar to that of the method of Embodiment 3, reference may be made to the implementations of the method of Embodiment 3 for implementations of this apparatus, with identical parts being not going to be described herein any further.

Figure 26:
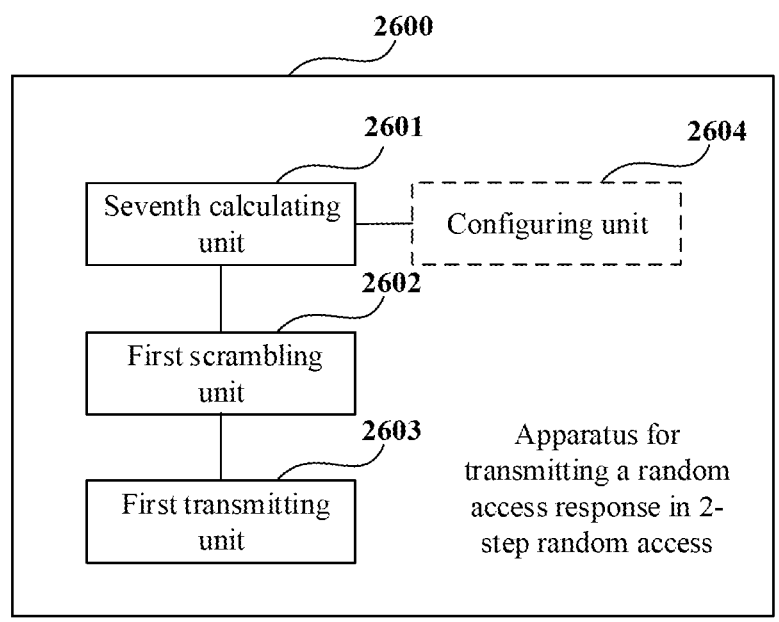
FIG. 26 is a schematic diagram of the apparatus for transmitting a random access response in the 2-step random access of Embodiment 9 of this disclosure.

FIG. 26 is a schematic diagram of the apparatus for transmitting a random access response in the 2-step random access of Embodiment 9 of this disclosure. As shown in FIG. 26, an apparatus 2600 includes:
- a seventh calculating unit 2601 configured to calculate a first RNTI, the first RNTI being different from an RA-RNTI actually used in the 4-step random access;
- a first scrambling unit 2602 configured to use the first RNTI to scramble cyclic redundancy check (CRC) of downlink control information used for scheduling a random access response; and
- a first transmitting unit 2603 configured to transmit the downlink control information and the random access response.

For example, the seventh calculating unit 2601 calculates the first RNTI according to a second RNTI and an offset.

Figure 27:
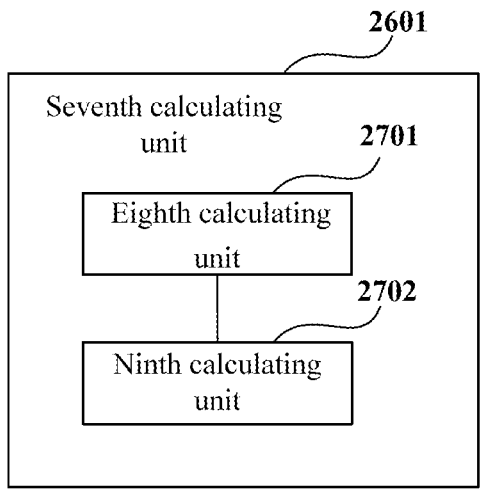
FIG. 27 is a schematic diagram of the seventh calculating unit 2601 of Embodiment 9 of this disclosure.

Corresponding to example 2) in Embodiment 1, FIG. 27 is a schematic diagram of the seventh calculating unit 2601 of Embodiment 9 of this disclosure. As shown in FIG. 27, the seventh calculating unit 2601 includes:
- an eighth calculating unit 2701 configured to calculate the third RNTI according to a fifth RNTI and a first offset; and/or,
- a ninth calculating unit 2702 configured to calculate the fourth RNTI according to the fifth RNTI, the first offset and a second offset.

In this case, the first scrambling unit 2602 uses the third RNTI to scramble cyclic redundancy check of first downlink control information used for scheduling a random access response, or uses the fourth RNTI to scramble cyclic redundancy check of second downlink control information used for scheduling a random access response.

In this embodiment, as shown in FIG. 26, the apparatus 2600 may further include: a configuring unit 2604 configured to configure at least one of the offset, the first offset and the second offset via at least one of the following: a broadcast message; RRC signaling; and an MAC CE (MAC control element).

In this embodiment, reference may be made to the description of corresponding steps in Embodiment 3 for implementations of functions of the above units, which shall not be repeated herein any further.

It can be seen from the above embodiment that by using an RNTI different from the RA-RNTI actually used in the 4-step random access to perform CRC scrambling on the DCI scheduling msgB, confusion of RNTIs in the 2-step random access may be avoided, that is, it may be not only avoided that a user equipment of the 2-step random access mistakenly deems MsgB or Msg2 of an RO not for itself as MsgB of an RO of itself, but also avoided that a user equipment of the 4-step random access mistakenly deems MsgB of an RO not for itself as Msg2 of an RO of itself.

EMBODIMENT 10

The embodiment of this disclosure provides an apparatus for transmitting a random access response in the 2-step random access, configured at a network device side. As a principle of the apparatus for solving problems is similar to that of the method of Embodiment 4, reference may be made to the implementations of the method of Embodiment 4 for implementations of this apparatus, with identical parts being not going to be described herein any further.

Figure 28:
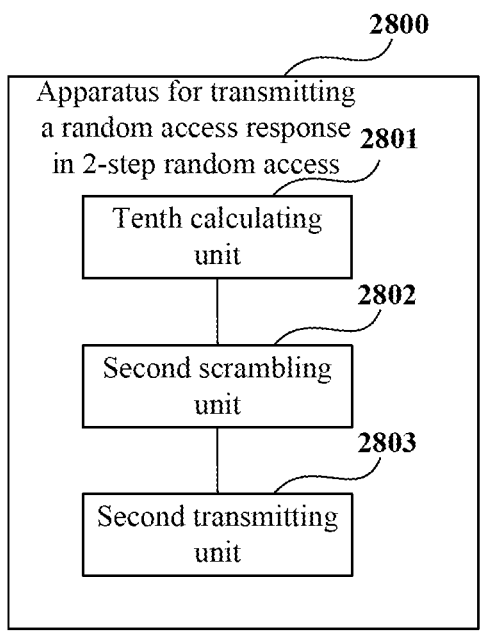
FIG. 28 is a schematic diagram of the apparatus for transmitting a random access response in the 2-step random access of Embodiment 10 of this disclosure.

FIG. 28 is a schematic diagram of the apparatus for transmitting a random access response in the 2-step random access of Embodiment 10 of this disclosure. As shown in FIG. 28, an apparatus 2800 includes:
- a tenth calculating unit 2801 configured to calculate a first RNTI, wherein, a value of the first RNIT being not greater than a maximum value of all possible values of an RA-RNTI in the 4-step random access;
- a second scrambling unit 2802 configured to use the first RNTI to scramble cyclic redundancy check of downlink control information scheduling a random access response; and
- a second transmitting unit 2803 configured to transmit the downlink control information and the random access response.

For example, the tenth calculating unit 2801 calculates the first RNTI according to a second RNTI and an offset.

Figure 29:
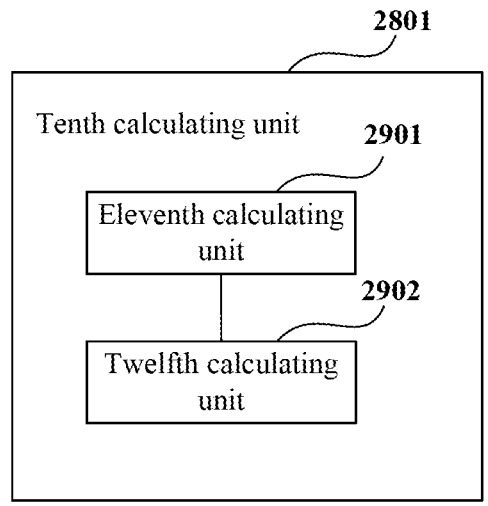
FIG. 29 is a schematic diagram of the tenth calculating unit 2801 of Embodiment 10 of this disclosure.

Corresponding to example 2) in Embodiment 1, FIG. 29 is a schematic diagram of the tenth calculating unit 2801 of Embodiment 10 of this disclosure. As shown in FIG. 29, the tenth calculating unit 2801 includes:

an eleventh calculating unit 2901 configured to calculate the third RNTI according to a fifth RNTI and a first offset; and/or a twelfth calculating unit 2902 configured to calculate the fourth RNTI according to the fifth RNTI, the first offset and a second offset.

In this embodiment, reference may be made to the description of corresponding steps in Embodiment 4 for implementations of functions of the above units, which shall not be repeated herein any further.

It can be seen from the above embodiment that by limiting the msg1-FDM parameter, the value of the first RNIT is not greater than the maximum value of all possible values of the RA-RNTI of the 4-step random access, which may also avoid RNTI confusion in the 2-step random access.

EMBODIMENT 11

The embodiments of this disclosure provide a user equipment, including the apparatus for receiving a random access response in the 2-step random access as described in Embodiment 7 or Embodiment 8.

Figure 30:
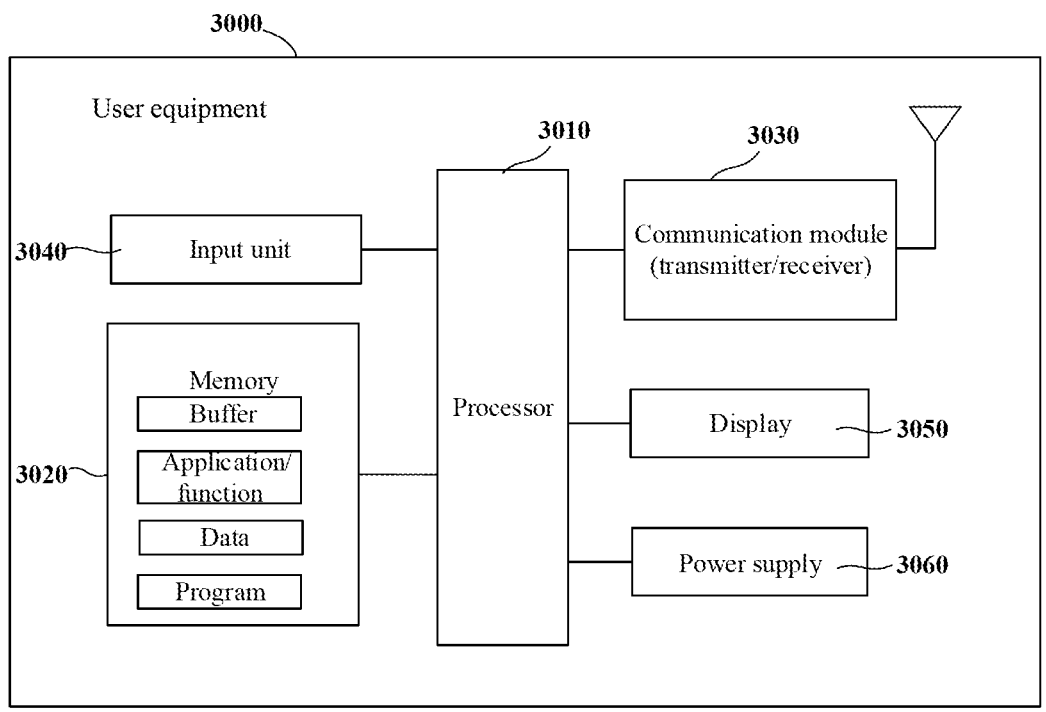
FIG. 30 is a block diagram of a systematic structure of the user equipment of Embodiment 11 of this disclosure.

FIG. 30 is a block diagram of a systematic structure of the user equipment of Embodiment 11 of this disclosure. As shown in FIG. 30, an user equipment 3000 may include a processor 3010 and a memory 3020, the memory 3020 being coupled to the processor 3010. It should be noted that this figure is illustrative only, and other types of structures may also be used, so as to supplement or replace this structure and achieve a telecommunications function or other functions.

In one implementation, the functions of the apparatus for receiving a random access response in the 2-step random access may be integrated into the processor 3010.

Corresponding to Embodiment 7, the processor 3010 may be configured to: calculate a first RNTI, the first RNTI being different from an RA-RNTI actually used in the 4-step random access; use the first RNTI to detect downlink control information (DCI) scheduling a random access response in a monitoring window; and when the downlink control information is successfully detected, receive the random access response in a physical downlink shared channel (PDSCH) according to the downlink control information.

Corresponding to Embodiment 8, the processor 3010 may be configured to: calculate a first RNTI, a value of the first RNTI being not greater than a maximum value of all possible values of an RA-RNTI in the 4-step random access; use the first RNTI to detect downlink control information scheduling a random access response in a monitoring window; and when the downlink control information is successfully detected, receive the random access response in a physical downlink shared channel according to the downlink control information.

In another implementation, the apparatus for receiving a random access response in the 2-step random access and the processor 3010 may be configured separately; for example, the apparatus for receiving a random access response in the 2-step random access may be configured as a chip connected to the processor 3010, and the functions of the apparatus for receiving a random access response in the 2-step random access are executed under control of the processor 3010.

As shown in FIG. 30, the user equipment 3000 may further include a communication module 3030, an input unit 3040, a display 3050, and a power supply 3060, etc. It should be noted that the user equipment 3000 does not necessarily include all the parts shown in FIG. 30. Furthermore, the user equipment 3000 may include parts not shown in FIG. 30, and the relevant art may be referred to.

As shown in FIG. 30, the processor 3010 is sometimes referred to as a controller or an operational control, which may include a microprocessor or other processor devices and/or logic devices. The processor 3001 receives input and controls operations of components of the user equipment 3000.

The memory 3020 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 3001 may execute programs stored in the memory 3020, so as to realize information storage or processing, etc. Functions of other parts are similar to those of the relevant art, which shall not be described herein any further. The parts of the user equipment 3000 may be realized by specific hardware, firmware, software, or any combination thereof, without departing from the scope of this disclosure.

It can be seen from the above embodiment that, corresponding to Embodiment 7, by using an RNTI different from the RA-RNTI actually used in the 4-step random access to perform CRC scrambling on the DCI scheduling msgB, confusion of RNTIs in the 2-step random access may be avoided, that is, it may be not only avoided that a user equipment of the 2-step random access mistakenly deems MsgB or Msg2 of an RO not for itself as MsgB of an RO of itself, but also avoided that a user equipment of the 4-step random access mistakenly deems MsgB of an RO not for itself as Msg2 of an RO of itself.

Furthermore, corresponding to Embodiment 8, by limiting the msg1-FDM parameter, the value of the first RNIT is not greater than the maximum value of all possible values of the RA-RNTI of the 4-step random access, which may also avoid RNTI confusion in the 2-step random access.

EMBODIMENT 12

The embodiments of this disclosure provide a network device, including the apparatus for transmitting a random access response in the 2-step random access as described in Embodiment 9 or 10.

Figure 31:
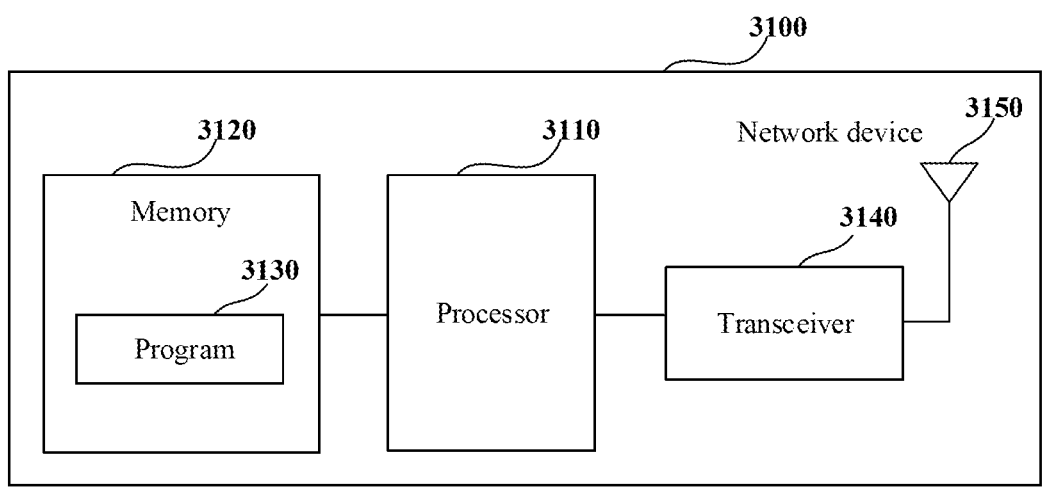
FIG. 31 is a schematic diagram of a structure of the network device of Embodiment 12 of this disclosure.

FIG. 31 is a schematic diagram of a structure of the network device of Embodiment of this disclosure. As shown in FIG. 31, a network device 3100 may include a processor 3110 and a memory 3120, the memory 3120 being coupled to the processor 3110. The memory 3120 may store various data, and furthermore, it may store a program 3130 for data processing, and execute the program 3130 under control of the processor 3110, so as to receive various data transmitted by a user equipment, and transmit various data to the user equipment.

In one implementation, the functions of the apparatus for transmitting a random access response in the 2-step random access may be integrated into the processor 3110.

Corresponding to Embodiment 9, the processor 3110 may be configured to: calculate a first RNTI, the first RNTI being different from an RA-RNTI actually used in the 4-step random access; use the first RNTI to scramble cyclic redundancy check (CRC) of downlink control information used for scheduling a random access response; and transmit the downlink control information and the random access response.

Corresponding to Embodiment 10, the processor 3110 may be configured to: calculate a first RNTI, a value of the first RNIT being not greater than a maximum value of all possible values of an RA-RNTI in the 4-step random access; use the first RNTI to scramble cyclic redundancy check of downlink control information scheduling a random access response; and transmit the downlink control information and the random access response.

In another implementation, the apparatus for transmitting a random access response in the 2-step random access and the processor 3110 may be configured separately; for example, the apparatus for transmitting a random access response in the 2-step random access may be configured as a chip connected to the processor 3110, and the functions of the apparatus for transmitting a random access response in the 2-step random access are executed under control of the processor 3110.

Furthermore, as shown in FIG. 31, the network device 3100 may include a transceiver 3140, and an antenna 3150, etc. Functions of the above components are similar to those in the relevant art, and shall not be described herein any further. It should be noted that the network device 3100 does not necessarily include all the parts shown in FIG. 31, and furthermore, the network device 3100 may include parts not shown in FIG. 31, and the relevant art may be referred to.

It can be seen from the above embodiment that, corresponding to Embodiment 9, by using an RNTI different from the RA-RNTI actually used in the 4-step random access to perform CRC scrambling on the DCI scheduling msgB, confusion of RNTIs in the 2-step random access may be avoided, that is, it may be not only avoided that a user equipment of the 2-step random access mistakenly deems MsgB or Msg2 of an RO not for itself as MsgB of an RO of itself, but also avoided that a user equipment of the 4-step random access mistakenly deems MsgB of an RO not for itself as Msg2 of an RO of itself.

Furthermore, corresponding to Embodiment 10, by limiting the msg1-FDM parameter, the value of the first RNIT is not greater than the maximum value of all possible values of the RA-RNTI of the 4-step random access, which may also avoid RNTI confusion in the 2-step random access.

EMBODIMENT 13

The embodiments of this disclosure provide a communication system, including the user equipment described in Embodiment 11 and/or the network device described in Embodiment 12.

For example, reference may be made to FIG. 3 for a structure of the communication system. As shown in FIG. 3, the communication system 100 includes a network device 101 and a user equipment 102. The user equipment 102 may be identical to the user equipment in Embodiment 11, and the network device 101 may be identical to the network device in Embodiment 12, with repeated parts being not going to be described herein any further.

It can be seen from the above embodiment that by using an RNTI different from the RA-RNTI actually used in the 4-step random access to perform CRC scrambling on the DCI scheduling msgB, confusion of RNTIs in the 2-step random access may be avoided, that is, it may be not only avoided that a user equipment of the 2-step random access mistakenly deems MsgB of an RO not for itself as MsgB or Msg2 of an RO of itself, but also avoided that a user equipment of the 4-step random access mistakenly deems MsgB of an RO not for itself as Msg2 of an RO of itself.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 21 may either correspond to software modules of procedures of a computer program, or correspond to hardware modules. Such software modules may respectively correspond to the steps shown in FIG. 7. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 21 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 21 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

According to various implementations disclosed in the embodiments of this disclosure, following supplements are further disclosed.

1. An apparatus for receiving a random access response in the 2-step random access, applicable to a user equipment (UE) side, the apparatus including:
   a first calculating unit configured to calculate a first RNTI, the first RNTI being different from an RA-RNTI actually used in the 4-step random access;
   a first detecting unit configured to use the first RNTI to detect downlink control information (DCI) scheduling a random access response in a monitoring window; and
   a first receiving unit configured to, when the downlink control information is successfully detected, receive the random access response in a physical downlink shared channel (PDSCH) according to the downlink control information.

2. The apparatus according to supplement 1, wherein, the first calculating unit calculates the first RNTI according to a second RNTI and an offset.

3. The apparatus according to supplement 1, wherein, the first RNTI includes a third RNTI and/or a fourth RNTI;
   the first calculating unit includes:
   a second calculating unit configured to calculate the third RNTI according to a fifth RNTI and a first offset; and/or
   a third calculating unit configured to calculate the fourth RNTI according to the fifth RNTI, the first offset and a second offset;
   and the first detecting unit includes:
   a second detecting unit configured to use the third RNTI to detect first downlink control information scheduling a first random access response in a monitoring window; and/or
   a third detecting unit configured to use the fourth RNTI to detect second downlink control information scheduling a second random access response in a monitoring window.

4. The apparatus according to supplement 2 or 3, wherein at least one of the following: the offset, the first offset and the second offset is configured by a network device via at least one of the following:
   a broadcast message;
   RRC signaling; and
   an MAC control element (MAC CE).

5. The apparatus according to supplement 2 or 3, wherein the offset or the first offset is greater than or equal to a value determined according to one of the following:
   a value range of the RA-RNTI;
   the value range of the RA-RNTI and configuration information of a second carrier;
   the value range of the RA-RNTI, configuration information of a second carrier and first PRACH configuration information of the 4-step random access on a second carrier; and
   configuration information of a second carrier, second PRACH configuration information of the 4-step random access on a second carrier and second PRACH configuration information of the 4-step random access on a first carrier.

6. The apparatus according to supplement 5, wherein the second offset is greater than or equal to a value determined according to one of the following:
   a value range of the fifth RNTI;
   the value range of the fifth RNTI and configuration information of a second carrier;
   the value range of the fifth RNTI, configuration information of a second carrier and first PRACH configuration information of the 2-step random access on a second carrier; and
   configuration information of a second carrier, second PRACH configuration information of the 2-step random access on a second carrier and second PRACH configuration information of the 2-step random access on a first carrier.

7. The apparatus according to supplement 2 or 3, wherein the offset or the first offset is greater than or equal to one of the following values:
   a maximum value of all possible values of the RA-RNTI;
   a maximum value of all possible values of the RA-RNTI satisfying a condition that an index of an uplink carrier used in transmitting a preamble is zero;
   a maximum value of all possible values of the RA-RNTI satisfying a condition that an index of a frequency resource where an RO is located is equal to an index of a frequency resource to which a maximum RA-RNTI that is actually used corresponds; and
   a maximum RA-RNTI that is actually used.

8. The apparatus according to supplement 7, wherein the second offset is greater than or equal to one of the following values:
   a maximum value of all possible values of the fifth RNTI;
   a maximum value of all possible values of the fifth RNTI satisfying a condition that an index of an uplink carrier used in transmitting a preamble is zero;
   a maximum value of all possible values of the fifth RNTI satisfying a condition that an index of a frequency resource where an RO is located is equal to an index of a frequency resource to which a maximum fifth RNTI that is actually used corresponds; and
   a maximum fifth RNTI that is actually used.

9. The apparatus according to supplement 2 or 3, wherein, the second RNTI or the fifth RNTI is determined according to an index of a first symbol where an RO of the 2-step random access is located, an index of a first slot where the RO of the 2-step random access is located in a system frame, an index of a frequency resource where the RO of the 2-step random access is located, an index of an uplink carrier used in transmitting a preamble, an index of a system frame, and a maximum monitoring window length to which a subcarrier interval corresponds, or
   the second RNTI or the fifth RNTI is determined according to an index of a first symbol where an RO of the 2-step random access is located, an index of a first slot where the RO of the 2-step random access is located in a system frame, an index of a frequency resource where the RO of the 2-step random access is located, an index of an uplink carrier used in transmitting a preamble, an index of a system frame, and a maximum monitoring window length, or
   the second RNTI or the fifth RNTI is determined according to an index of a first symbol where an RO of the 2-step random access is located, an index of a first slot where the RO of the 2-step random access is located in a system frame, an index of a frequency resource where the RO of the 2-step random access is located, and an index of an uplink carrier used in transmitting a preamble.

10. The apparatus according to supplement 9, wherein when 2-step random access and the 4-step random access share an RO and/or the maximum monitoring window length does not exceed 10 milliseconds, the fifth RNTI is determined according to an index of a first symbol where the RO of the 2-step random access is located, an index of a first slot where the RO of the 2-step random access is located in a system frame, an index of a frequency resource where the RO of the 2-step random access is located, and an index of an uplink carrier used in transmitting a preamble, and the first offset is equal to zero.

11. The apparatus according to supplement 9, wherein 10240 is divisible by the maximum monitoring window length in millisecond.

12. The apparatus according to supplement 1, wherein,
when a slot or a symbol where an uplink shared channel is located is unavailable and a slot or a symbol where a preamble associated with the uplink shared channel is located is available,
2-step random access allows the slot or the symbol where a preamble associated with the uplink shared channel is located to be used for transmitting the preamble, and the monitoring window is located behind the slot or the symbol where the uplink shared channel is located, or 2-step random access does not allow the slot or the symbol where a preamble associated with the uplink shared channel is located to be used for transmitting the preamble.

13. An apparatus for receiving a random access response in the 2-step random access, applicable to a UE side, the apparatus including:
a fourth calculating unit configured to calculate a first RNTI, wherein a value of the first RNTI is not greater than a maximum value of all possible values of an RA-RNTI of the 4-step random access;
a fourth detecting unit configured to use the first RNTI to detect downlink control information scheduling a random access response in a monitoring window; and
a second receiving unit configured to, when the downlink control information is successfully detected, receive the random access response in a physical downlink shared channel according to the downlink control information.

14. The apparatus according to supplement 13, wherein, the fourth calculating unit calculates the first RNTI according to a second RNTI and an offset,
and the offset is determined according to the configuration information of the second carrier, the second PRACH configuration information of four-step random access on the second carrier and the second PRACH configuration information of four-step random access on the first carrier, and a sum of an msg1-FDM parameter in PRACH resource configuration of four-step random access of the carrier and an msg1-FDM parameter in the PRACH resource configuration of two-step random access of the same carrier is not greater than 8.

15. The apparatus according to supplement 13, wherein, the first RNTI includes a third RNTI and a fourth RNTI, values of both the third RNTI and the fourth RNTI being not greater than a maximum value of all possible values of an RA-RNTI in the 4-step random access,
the fourth calculating unit includes:
a fifth calculating unit configured to calculate the third RNTI according to the fifth RNTI and the first offset; and/or
a sixth calculating unit configured to calculate the fourth RNTI according to the fifth RNTI, the first offset and the second offset,
and the first offset is greater than or equal to the value determined according to the configuration information of the second carrier, the second PRACH configuration information of the 4-step random access on the second carrier and the second PRACH configuration information of the 4-step random access on the first carrier, the second offset is greater than or equal to the value determined according to the PRACH configuration information of the second carrier, the second PRACH configuration information of the 4-step random access on the second carrier and the second PRACH configuration information of the 2-step random access on the first carrier, and a sum of the msg1-FDM parameter in the PRACH resource configuration of the 4-step random access of the carrier and twice of the msg1-FDM parameter in the PRACH resource configuration of the 4-step random access on the same carrier is not greater than 8.

16. An apparatus for transmitting a random access response in the 2-step random access, applicable to a network device side, the apparatus including:
a seventh calculating unit configured to calculate a first RNTI, the first RNTI being different from an RA-RNTI actually used in the 4-step random access;
a first scrambling unit configured to use the first RNTI to scramble cyclic redundancy check (CRC) of downlink control information used for scheduling a random access response; and
a first transmitting unit configured to transmit the downlink control information and the random access response.

17. The apparatus according to supplement 16, wherein, the seventh calculating unit calculates the first RNTI according to a second RNTI and an offset.

18. The apparatus according to supplement 16, wherein, the first RNTI includes a third RNTI and/or a fourth RNTI;
the seventh calculating unit includes:
an eighth calculating unit configured to calculate the third RNTI according to a fifth RNTI and a first offset; and/or
a ninth calculating unit configured to calculate the fourth RNTI according to the fifth RNTI, the first offset and a second offset;
and the first scrambling unit uses the third RNTI to scramble cyclic redundancy check of first downlink control information used for scheduling a random access response, or uses the fourth RNTI to scramble cyclic redundancy check of second downlink control information used for scheduling a random access response.

19. The apparatus according to supplement 17 or 18, wherein the apparatus further includes:
a configuring unit configured to configure at least one of the following: the offset, the first offset and the second offset via at least one of the following:
a broadcast message;
RRC signaling; and
an MAC control element (MAC CE).

20. The apparatus according to supplement 17 or 18, wherein,
the offset or the first offset is greater than or equal to a value determined according to one of the following:
a value range of the RA-RNTI;
the value range of the RA-RNTI and configuration information of a second carrier;
the value range of the RA-RNTI, configuration information of a second carrier and first PRACH configuration information of the 4-step random access on a second carrier; and
configuration information of a second carrier, second PRACH configuration information of the 4-step random access on a second carrier and second PRACH configuration information of the 4-step random access on a first carrier.

21. The apparatus according to supplement 20, wherein the second offset is greater than or equal to a value determined according to one of the following:
- a value range of the fifth RNTI;
- the value range of the fifth RNTI and configuration information of a second carrier;
- the value range of the fifth RNTI, configuration information of a second carrier and first PRACH configuration information of the 2-step random access on a second carrier; and
- configuration information of a second carrier, second PRACH configuration information of the 2-step random access on a second carrier and second PRACH configuration information of the 2-step random access on a first carrier.

22. The apparatus according to supplement 17 or 18, wherein,
the offset or the first offset is greater than or equal to one of the following values:
- a maximum value of all possible values of the RA-RNTI;
- a maximum value of all possible values of the RA-RNTI satisfying a condition that an index of an uplink carrier used in transmitting a preamble is zero;
- a maximum value of all possible values of the RA-RNTI satisfying a condition that an index of a frequency resource where an RO is located is equal to an index of a frequency resource to which a maximum RA-RNTI that is actually used corresponds; and
- a maximum RA-RNTI that is actually used.

23. The apparatus according to supplement 22, wherein the second offset is greater than or equal to one of the following values:
- a maximum value of all possible values of the fifth RNTI;
- a maximum value of all possible values of the fifth RNTI satisfying a condition that an index of an uplink carrier used in transmitting a preamble is zero;
- a maximum value of all possible values of the fifth RNTI satisfying a condition that an index of a frequency resource where an RO is located is equal to an index of a frequency resource to which a maximum fifth-RNTI that is actually used corresponds; and
- a maximum fifth RNTI that is actually used.

24. The apparatus according to supplement 17 or 18, wherein,
the second RNTI or the fifth RNTI is determined according to an index of a first symbol where an RO of the 2-step random access is located, an index of the first slot where the RO of the 2-step random access is located in a system frame, an index of the frequency resource where the RO of the 2-step random access is located, an index of the uplink carrier used in transmitting a preamble, a system frame index and a maximum monitoring window length to which a subcarrier spacing corresponds, or
the second RNTI or the fifth RNTI is determined according to an index of a first symbol where an RO of the 2-step random access is located, an index of the first slot where the RO of the 2-step random access is located in a system frame, an index of the frequency resource where the RO of the 2-step random access is located, an index of the uplink carrier used in transmitting a preamble, a system frame index and a maximum monitoring window length, or
the second RNTI or the fifth RNTI is determined according to an index of a first symbol where an RO of the 2-step random access is located, an index of the first slot where the RO of the 2-step random access is located in a system frame, an index of the frequency resource where the RO of the 2-step random access is located and an index of the uplink carrier used in transmitting a preamble.

25. The apparatus according to supplement 24, wherein when 2-step random access and 4-step random access share an RO and/or the maximum monitoring window length is not greater than 10 milliseconds, the fifth RNTI is determined according to an index of a first symbol where an RO of the 2-step random access is located, an index of the first slot where the RO of the 2-step random access is located in a system frame, an index of the frequency resource where the RO of the 2-step random access is located and an index of the uplink carrier used in transmitting a preamble, and the first offset is equal to 0.

26. The apparatus according to supplement 24, wherein 10240 is divisible by the maximum monitoring window length in millisecond.

27. The apparatus according to supplement 16, wherein, when a slot or a symbol where an uplink shared channel is located is unavailable and a slot or a symbol where a preamble associated with the uplink shared channel is located is available,
2-step random access allows the slot or the symbol where a preamble associated with the uplink shared channel is located to be used for transmitting the preamble, and the monitoring window is located behind the slot or the symbol where the uplink shared channel is located, or
2-step random access does not allow the slot or the symbol where a preamble associated with the uplink shared channel is located to be used for transmitting the preamble.

28. An apparatus for transmitting a random access response in the 2-step random access, applicable to a network device side, the apparatus including:
- a tenth calculating unit configured to calculate a first RNTI, wherein a value of the first RNTI is not greater than a maximum value of all possible values of an RA-RNTI of the 4-step random access;
- a second scrambling unit configured to use the first RNTI to scramble cyclic redundancy check of downlink control information used for scheduling a random access response; and
- a second transmitting unit configured to transmit the downlink control information and the random access response.

29. The apparatus according to supplement 28, wherein, the tenth calculating unit calculates the first RNTI according to a second RNTI and an offset,
and the offset is greater than or equal to a value determined according to the configuration information of the second carrier, the second PRACH configuration information of four-step random access on the second carrier and the second PRACH configuration information of four-step random access on the first carrier, and a sum of an msg1-FDM parameter in PRACH resource configuration of four-step random access of the carrier and an msg1-FDM parameter in the PRACH resource configuration of two-step random access of the same carrier is not greater than 8.

30. The apparatus according to supplement 28, wherein, the first RNTI includes a third RNTI and a fourth RNTI, values of both the third RNTI and the fourth RNTI being not greater than a maximum value of all possible values of an RA-RNTI in the 4-step random access, the tenth calculating unit includes:
an eleventh calculating unit configured to calculate the third RNTI according to a fifth RNTI and a first offset; and/or
a twelfth calculating unit configured to calculate the fourth RNTI according to the fifth RNTI, the first offset and a second offset,
and the first offset is greater than or equal to the value determined according to the configuration information of the second carrier, the second PRACH configuration information of the 4-step random access on the second carrier and the second PRACH configuration information of the 4-step random access on the first carrier, the second offset is greater than or equal to the value determined according to the PRACH configuration information of the second carrier, the second PRACH configuration information of the 4-step random access on the second carrier and the second PRACH configuration information of the 2-step random access on the first carrier, and a sum of the msg1-FDM parameter in the PRACH resource configuration of the 4-step random access of the carrier and twice of the msg1-FDM parameter in the PRACH resource configuration of the 4-step random access on the same carrier is not greater than 8.

31. A user equipment, including the apparatus as described in any one of supplements 1-15.

32. A network device, including the apparatus as described in any one of supplements 16-30.

33. A communication system, including the user equipment as described in supplement 31 and/or the network device as described in supplement 32.

What is claimed is:

1. An apparatus for receiving a random access response in a 2-step random access, applicable to a user equipment (UE) side, the apparatus comprising:
a processor configured to:
calculate a first RNTI, the first RNTI being different from an RA-RNTI actually used in a 4-step random access;
use the first RNTI to detect downlink control information (DCI) scheduling a random access response in a monitoring window; and
a receiver configured to, when the downlink control information is successfully detected, receive the random access response in a physical downlink shared channel (PDSCH) according to the downlink control information,
wherein
when a slot or a symbol where an uplink shared channel is located is unavailable and a slot or a symbol where a preamble associated with the uplink shared channel is located is available,
the 2-step random access allows the slot or the symbol where a preamble associated with the uplink shared channel is located to be used for transmitting the preamble, and the monitoring window is located behind the slot or the symbol where the uplink shared channel is located.

2. The apparatus according to claim 1, wherein,
the processor is configured to calculate the first RNTI according to a second RNTI and an offset.

3. The apparatus according to claim 2, wherein at least one of the following: the offset is configured by a network device via at least one of the following:
a broadcast message;
RRC signaling; and
an MAC control element (MAC CE).

4. The apparatus according to claim 2, wherein the offset is greater than or equal to a value determined according to one of the following:
a value range of the RA-RNTI;
the value range of the RA-RNTI and configuration information of a second carrier;
the value range of the RA-RNTI, configuration information of a second carrier and first PRACH configuration information of the 4-step random access on a second carrier; and
configuration information of a second carrier, second PRACH configuration information of the 4-step random access on a second carrier and second PRACH configuration information of the 4-step random access on a first carrier.

5. The apparatus according to claim 2, wherein the offset is greater than or equal to one of the following values:
a maximum value of all possible values of the RA-RNTI;
a maximum value of all possible values of the RA-RNTI satisfying a condition that an index of an uplink carrier used in transmitting a preamble is zero;
a maximum value of all possible values of the RA-RNTI satisfying a condition that an index of a frequency resource where PRACH occasion (RO) is located is equal to an index of a frequency resource to which a maximum RA-RNTI that is actually used corresponds; and
a maximum RA-RNTI that is actually used.

6. The apparatus according to claim 2, wherein,
the second RNTI is determined according to an index of a first symbol where a PRACH occasion (RO) of the 2-step random access is located, an index of a first slot where the RO of the 2-step random access is located in a system frame, an index of a frequency resource where the RO of the 2-step random access is located, and an index of an uplink carrier used in transmitting a preamble.

7. The apparatus according to claim 6, wherein 10240 is divisible by the maximum monitoring window length in millisecond.

8. An apparatus for transmitting a random access response in a 2-step random access, applicable to a network device side, the apparatus comprising:
a processor configured to:
calculate a first RNTI, the first RNTI being different from an RA-RNTI actually used in a 4-step random access, and
use the first RNTI to scramble cyclic redundancy check (CRC) of downlink control information used for scheduling a random access response; and
a transmitter configured to transmit the downlink control information and the random access response,
wherein
when a slot or a symbol where an uplink shared channel is located is unavailable and a slot or a symbol where a preamble associated with the uplink shared channel is located is available,
the 2-step random access allows the slot or the symbol where a preamble associated with the uplink shared channel is located to be used for transmitting the preamble, and the monitoring window is located behind the slot or the symbol where the uplink shared channel is located.

9. The apparatus according to claim 8, wherein,
the processor calculates the first RNTI according to a second RNTI and an offset.

10. The apparatus according to claim 9, wherein the processor is further configured to:
a configuring unit configured to configure at least one of the following: the offset via at least one of the following:
a broadcast message;
RRC signaling; and
an MAC control element (MAC CE).

11. The apparatus according to claim 9, wherein, the offset is greater than or equal to a value determined according to one of the following:
a value range of the RA-RNTI;
the value range of the RA-RNTI and configuration information of a second carrier;
the value range of the RA-RNTI, configuration information of a second carrier and first PRACH configuration information of the 4-step random access on a second carrier; and
configuration information of a second carrier, second PRACH configuration information of the 4-step random access on a second carrier and second PRACH configuration information of the 4-step random access on a first carrier.

12. The apparatus according to claim 9, wherein, the offset is greater than or equal to one of the following values:
a maximum value of all possible values of the RA-RNTI;
a maximum value of all possible values of the RA-RNTI satisfying a condition that an index of an uplink carrier used in transmitting a preamble is zero;
a maximum value of all possible values of the RA-RNTI satisfying a condition that an index of a frequency resource where a PRACH occasion (RO) is located is equal to an index of a frequency resource to which a maximum RA-RNTI that is actually used corresponds; and
a maximum RA-RNTI that is actually used.

* * * * *